United States Patent
Lim et al.

(10) Patent No.: US 9,253,318 B2
(45) Date of Patent: Feb. 2, 2016

(54) METHOD AND APPARATUS FOR PROVIDING STATE INFORMATION

(71) Applicant: Samsung Electronics Co., Ltd., Gyeonggi-do (KR)

(72) Inventors: Kyung-Soo Lim, Gyeonggi-do (KR); Ju-Youn Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/185,315

(22) Filed: Feb. 20, 2014

(65) Prior Publication Data

US 2014/0287728 A1    Sep. 25, 2014

(30) Foreign Application Priority Data

Mar. 19, 2013  (KR) .......................... 10-2013-0029399

(51) Int. Cl.
*H04M 3/42*    (2006.01)
*H04L 12/58*    (2006.01)
*H04W 4/12*    (2009.01)
*H04W 4/16*    (2009.01)

(52) U.S. Cl.
CPC ........ *H04M 3/42365* (2013.01); *H04L 12/5815* (2013.01); *H04L 51/28* (2013.01); *H04W 4/12* (2013.01); *H04W 4/16* (2013.01); *H04L 51/38* (2013.01)

(58) Field of Classification Search
CPC ..... H04L 12/5815; H04L 51/28; H04L 51/38; H04M 3/42365; H04W 4/12; H04W 4/16

USPC .......................... 455/414.1–414.2, 566, 550.1, 455/412.1–412.2, 466, 457, 456.1

See application file for complete search history.

(56) References Cited

U.S. PATENT DOCUMENTS

| | | | |
|---|---|---|---|
| 2004/0203766 A1* | 10/2004 | Jenniges et al. | 455/435.1 |
| 2004/0268265 A1 | 12/2004 | Berger | |
| 2007/0198725 A1 | 8/2007 | Morris | |
| 2008/0148154 A1* | 6/2008 | Burrell et al. | 715/733 |
| 2010/0211604 A1 | 8/2010 | Campbell et al. | |
| 2011/0081924 A1 | 4/2011 | Sennett et al. | |

OTHER PUBLICATIONS

European Search Report dated Jul. 31, 2015 issued in counterpart application No. 14160547.7-1862, 9 pages.

* cited by examiner

*Primary Examiner* — Babar Sarwar
(74) *Attorney, Agent, or Firm* — The Farrell Law Firm, P.C.

(57) ABSTRACT

Methods and apparatus are provided for providing state information of a digital apparatus. State information for a user of the digital apparatus is determined based on the user's intention to perform communication. The state information is transmitted to a server. A display request for a contact list is received. A screen having a plurality of user items is displayed. Each of the plurality of user items corresponds to a respective one of a plurality of users in the contact list. At least one of the plurality of user items includes identification information of a user corresponding to the at least one of the plurality of user items, state information of the corresponding user that is received from the server, and at least one category indicator representing at least one recommended communication service category determined based on the state information of the corresponding user.

28 Claims, 15 Drawing Sheets

METHOD AND APPARATUS FOR PROVIDING STATE INFORMATION

PRIORITY

This application claims priority under 35 U.S.C. §119(a) to Korean Application Serial No. 10-2013-0029399, which was filed in the Korean Intellectual Property Office on Mar. 19, 2013, the entire content of which is incorporated herein by reference.

BACKGROUND OF THE INVENTION

1. Field of the Invention

The present invention relates generally to a digital apparatus capable of performing telephone communication, and more particularly, to a method and an apparatus for sharing state information of a digital apparatus with another digital apparatus.

2. Description of the Related Art

Presence information is a user state indicator that conveys the ability and willingness of a potential communication counterpart to communicate. A client is commonly installed in a communication device of a user such that communication can be performed. A user client provides state information, which is used in representing presence information of the user, to a server or a service provider supervising communication through a network connection. Accordingly, the state information may be stored in the server, and may be distributed to other users. The state information is applied to various communication services, and specifically, to an instant messaging service.

State information is user related information such as, for example, a current location of a user, available connection information for a user, or application specification information including, for example, instant message related information, information indicating whether a user is online or offline, and a Push to Talk over Cellular (POC) specification attribute. A user is required to subscribe to a user's required state information, and other users certify that the user watches their state information.

State information is used only in an Instant Messaging (IM) service, and cannot be extensively used in other communication services or shared between different IM services.

Although different types of messenger services exist through which chatting can be performed between subscribers in the IM service, the state information cannot be shared between the different messenger services. For example, when user A and user B have both subscribed to both messenger service A and messenger service B, user A must separately set state information in messenger service A and messenger service B, and user B in messenger service B cannot determine the state information of user A in messenger service A.

Moreover, state information used in the IM service is not available in a telephone call based communication service. Specifically, users can not set their state information related to a telephone communication service or a text message service, and share the state information with other users.

The state information of counterpart devices is not available in the telephone communication service or the text message service, resulting in users making a call or sending a text message without considering the states of the counterpart devices. Further, the counterpart devices are inconvenienced by telephone call or text message reception at undesirable moments.

SUMMARY OF THE INVENTION

The present invention has been made to address at least the above problems and/or disadvantages and to provide at least the advantages described below. Accordingly, an aspect of the present invention provides a method and an apparatus for providing state information, which can be integrally used in various communication services.

Another aspect of the present invention provides a method and an apparatus for providing state information, which can be applied to a telephone communication based communication service.

Another aspect of the present invention provides a method and an apparatus for providing state information in which a telephone communication service and an IM service are interlocked with each other.

Another aspect of the present invention provides a method and an apparatus, which can more easily set state information.

In accordance with one aspect of the present invention, a method provides state information of a digital apparatus. State information for a user of the digital apparatus is determined based on the user's intention to perform communication using one or more communication service categories of the digital apparatus. The state information is transmitted to a server for transfer of the state information to at least one user in a contact list. A display request for the contact list is received. A screen having a plurality of user items is displayed. Each of the plurality of user items corresponds to a respective one of a plurality of users in the contact list. At least one of the plurality of user items includes identification information of a user corresponding to the at least one of the plurality of user items, state information of the corresponding user that is received from the server, and at least one category indicator representing at least one recommended communication service category determined based on the state information of the corresponding user.

In accordance with another aspect of the present invention, a digital apparatus is provided for providing state information. The digital apparatus includes a display panel that displays data under the control of a controller. The digital apparatus also includes the controller that determines state information for a user of the digital apparatus based on the user's intention to perform communication using one or more communication service categories of the digital apparatus, transmits the state information to a server for transfer of the state information to at least one user in a contact list, and when a display request for the contact list is received, displays a screen having a plurality of user items, each of the plurality of user items corresponding to a respective one of a plurality of users in the contact list on the display panel. At least one of the plurality of user items includes identification information of a user corresponding to the at least one of the plurality of user items, state information of the corresponding user that is received from the server, and at least one category indicator representing at least one recommended communication service category determined based on the state information of the corresponding user.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
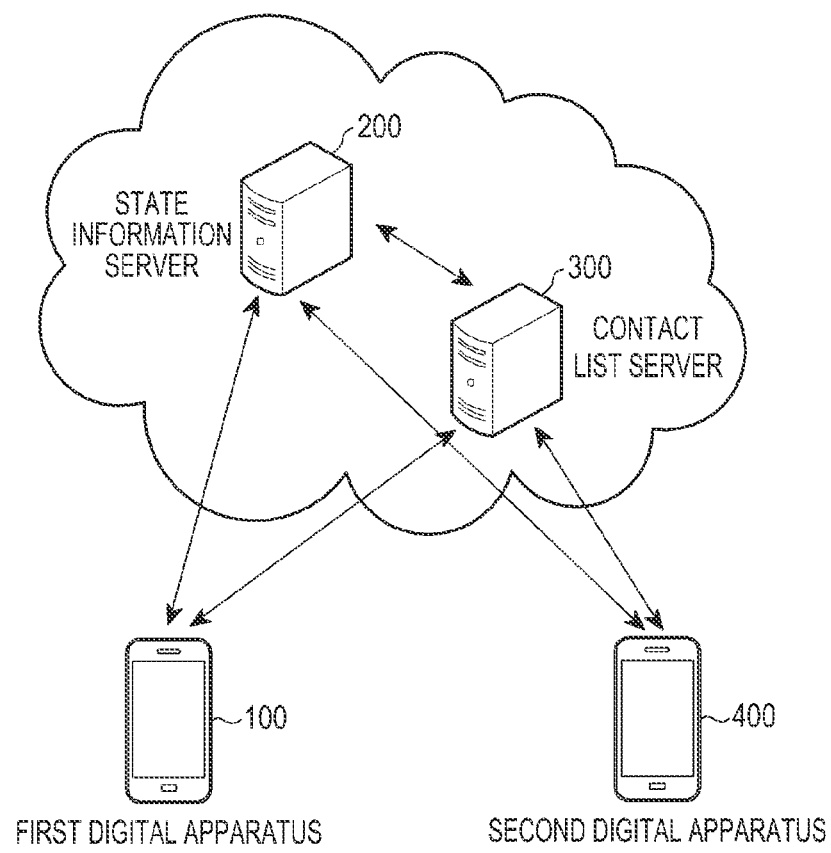
FIG. 1 is a diagram illustrating a state information sharing system, according to an embodiment of the present invention.

Embodiments of the present invention are described in detail with reference to the accompanying drawings. The same or similar components may be designated by the same or similar reference numerals although they are illustrated in different drawings. Detailed descriptions or constructions or processes known in the art may be omitted to avoid obscuring the subject matter of the present invention.

Presence information is a user state indicator that conveys the ability and willingness of a potential communication counterpart to communicate. State information, which represents the presence information, is required to be shared between users.

Embodiments of the present invention provide a method capable of sharing user state information in a communication service based on phone communication, and integrally using the state information in the phone communication service and the IM service. Specifically, embodiments of the present invention provide a method for providing the user state information, which can be applied to a communication service in which a phone number is used, as subscriber identification information and a communication address. The state information proposed in embodiments of the present invention corresponds to information for representing a representative state of a user using a digital apparatus, and may be compatible with the state information used in the IM service.

Hereinafter, a communication service using a phone number as subscriber identification information and a communication address is referred to as a phone communication service. Phone communication services include, for example, a mobile phone service, a video phone service, an Internet phone service, a wired phone service, and a messaging service based on a phone number. State information that is used only in the IM service is referred to as IM state information.

Accordingly, embodiments of the present invention provide a method capable of sharing user state information between users corresponding to phone numbers included in a contact list stored in the digital apparatus. The contact list corresponds to a list that integrally manages user information including phone numbers of a user or other users of the digital apparatus, which have been stored in the digital apparatus. Each of the user items constituting the contact list corresponds to one user.

According to an embodiment of the present invention, the state information in the digital apparatus corresponds to information that represents a use intention for a user's communication service category. It is assumed that the state information is divided into a normal state, a busy state, and a no disturbance state. The normal state represents a state in which a user can use a telephone call based communication service, such as a voice all, and a text based communication service, such as a text transmission. The busy state represents a state in which the user can not use the telephone call based communication service, but can use the text based communication service. The no disturbance state represents a state in which the user can use neither the telephone call based communication service nor the text based communication service. More specifically, the normal state corresponds to a state in which both the telephone call based communication service and the text based communication service are preferred by the corresponding user, the busy state corresponds to a state in which only the text based communication service is preferred by the corresponding user, and the no disturbance state corresponds to a state in which neither the telephone call based communication service nor the text based communication service is preferred by the corresponding user.

Although the three types of state information are described in embodiments of the present invention, the state information may also be further subdivided according to another embodiment of the present invention. The state information is not divided according to whether or not to the telephone call based communication service or the text based communication service of the digital apparatus is operated (or whether or not the corresponding communication service is provided), but according to whether or not the telephone call based communication service or the text based communication service can be used from a point of view of the user, or whether or not the user has an intention of using the corresponding service. Moreover, terms referred to as the state information of the digital apparatus may represent user state information designated by a user of the digital apparatus, and may also represent state information of a user or other users stored or set in the digital apparatus. The terms referred to as the state information of the digital apparatus may include state information of at least one another user, which is received from an external device of the digital apparatus. Accordingly, the terms referred to as the state information of the digital apparatus should be properly interpreted according to a context thereof.

The state information may be arbitrarily designated to the digital apparatus according to an input of a user, and the digital apparatus may automatically change the state information when a predetermined condition is satisfied. Moreover, it will be understood by those skilled in the art that names for differentiating states may also be provided differently according to a desired use of the state information, and an intention of a service provider or a developer using the state information.

FIG. 1 is a diagram illustrating a user state information sharing system for providing user state information, according to an embodiment of the present invention.

Referring to FIG. 1, the user state information sharing system includes a plurality of digital apparatuses 100 and 400, a state information server 200, and a contact list server 300. The plurality of digital apparatuses 100 and 400, the state information server 200, and the contact list server 300 may communicate with each other through various wired/wireless communication networks. For example, the wired/wireless communication networks may include a mobile communication network, an IP network, an Internet, and a Public Switched Telephone Network (PSTN). The state information server 200 and the contact list server 300, which are logically separated servers, may be realized by separate devices, or may be realized in a single device.

The state information server 200 is a device for mapping and managing service user IDs registered in a user state information sharing service, and state information according to the IDs. The state information server 200 processes a service subscription of a user, and requests related to state information that are received from the digital apparatus of the user in conjunction with the contact list server 300.

Figure 2:
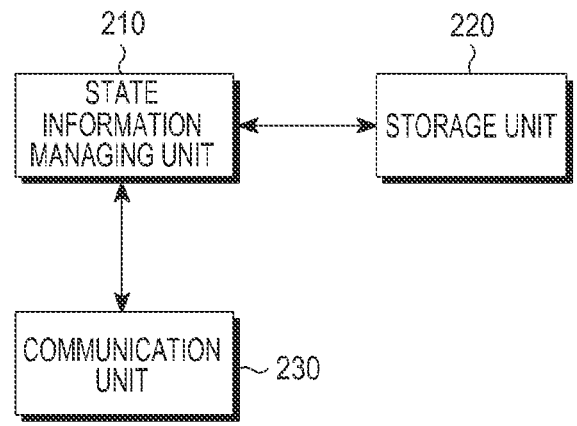
FIG. 2 is a block diagram illustrating a state information managing server, according to an embodiment of the present invention.

The state information server 200 is described in greater detail with respect to FIG. 2. FIG. 2 is a block diagram illustrating a state information managing server, according to an embodiment of the present invention. Referring to FIG. 2, the state information server 200 includes a state information managing unit 210, a storage unit 220, and a communication unit 230.

The communication unit 230 transmits/receives data to/from the user's digital apparatuses 100 and 400 or the contact list server 300, to perform communication under the control of the state information managing unit 210.

The storage unit 220 stores a signal or data, which is input/output to correspond to an operation of the communication unit 230, under the control of the state information managing unit 210. The storage unit 220 may store control programs for controlling the state managing server 200 or the state information managing unit 210, and applications. The service user IDs registered in the user state information sharing service, and the state information mapped according to the IDs, are stored in the storage unit 220.

The state information managing unit 210 controls overall operations of the state information server 200. When receiving service registration requests for users from the user digital apparatuses 100 and 400 through the communication unit 230, the state information managing unit 210 processes authentication to register the corresponding user as a service subscriber, and allots and stores a service user ID in the storage unit 220. The state information managing unit 210 requests a service registration for the corresponding user from the contact list server 300.

Moreover, the state information managing unit 210 requests and receives state information and contact lists from the digital apparatuses 100 and 400 of the users having been registered in the service, and transfers the state information and the contact lists to the contact list server 300. The state information managing unit 210 collects and transmits the updated state information of the digital apparatuses 100 and 400 to the contact server list 300.

The contact list server 300 registers the users having subscribed to the user state information sharing service, manages the state information and the contact lists according to the users, and refers the related contact list according to a user's state information update to transmit the state information in response to a request of the state information server 200. The contact list server 300 is described in greater detail with respect to FIG. 3.

Figure 3:
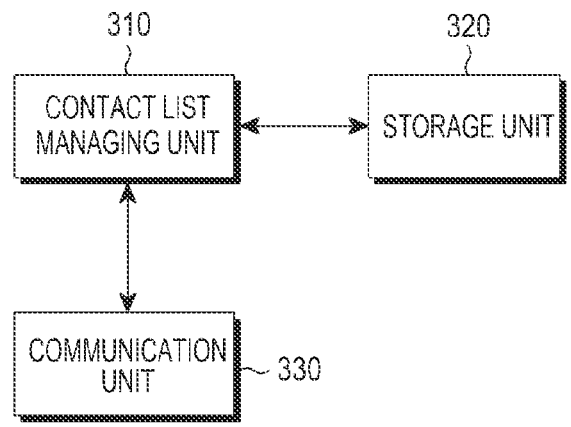
FIG. 3 is a block diagram illustrating a contact list server, according to an embodiment of the present invention.

Referring to FIG. 3, the contact list server 300 includes a contact list managing unit 310, a storage unit 320, and a communication unit 330.

The communication unit 330 transmits/receives data to/from the user digital apparatuses 100 and 400 or the state information server 200, to perform communication under the control of the contact list managing unit 310.

The storage unit 320 may store a signal or data, which is input/output to correspond to an operation of the communication unit 330 under the control of the contact list managing unit 310. The storage unit 320 may store control programs for controlling the contact managing server 300 or the contact list managing unit 310, and applications. The storage unit 320 stores the service user IDs registered in the user state information sharing service, the state information and the contact list according to the users, and the related state information.

The contact list managing unit 310 controls overall operations of the contact list server 300. The contact list managing unit 310 registers the users having subscribed to the user state information sharing service, and stores a service user ID of the corresponding user in the storage unit 320, in response to a request of the state information server 200. The contact list managing unit 310 stores a contact list and state information transferred from the state information server 200 in correspondence to a specific service user ID in the storage unit 320 to correspond to the related service user ID. When receiving the updated user state information of a specific digital apparatus, for example, a first digital apparatus 100 from the state information server 200, the contact list managing unit 310 changes the state information of the first digital apparatus 100 to the transferred state information to store it in the storage unit 320.

The contact list managing unit 310 transmits the changed state information of the digital apparatuses to the digital apparatuses of the users included in the contact lists with reference to the related contact lists. For example, the contact list managing unit 310 updates the state information of the first digital apparatus 100, and then searches for the contact list stored to correspond to the first digital apparatus 100. The contact list managing unit 310 transmits the state information of the first digital apparatus 100 to the users included in the discovered contact list.

Referring back to FIG. 1, the user digital apparatuses 100 and 400 correspond to communication devices for providing a phone communication service, and may embodied as, for example, a mobile communication terminal, a smart phone, a tablet Personal Computer (PC), a PC, or a digital wired/wireless phone. An embodiment of the user digital apparatuses 100 and 400 is described in greater detail with respect to FIG. 4. Although the first digital apparatus 100 is shown as an example of the digital apparatus in FIG. 4, the second digital apparatus 400 may be similarly or identically constituted.

Figure 4:
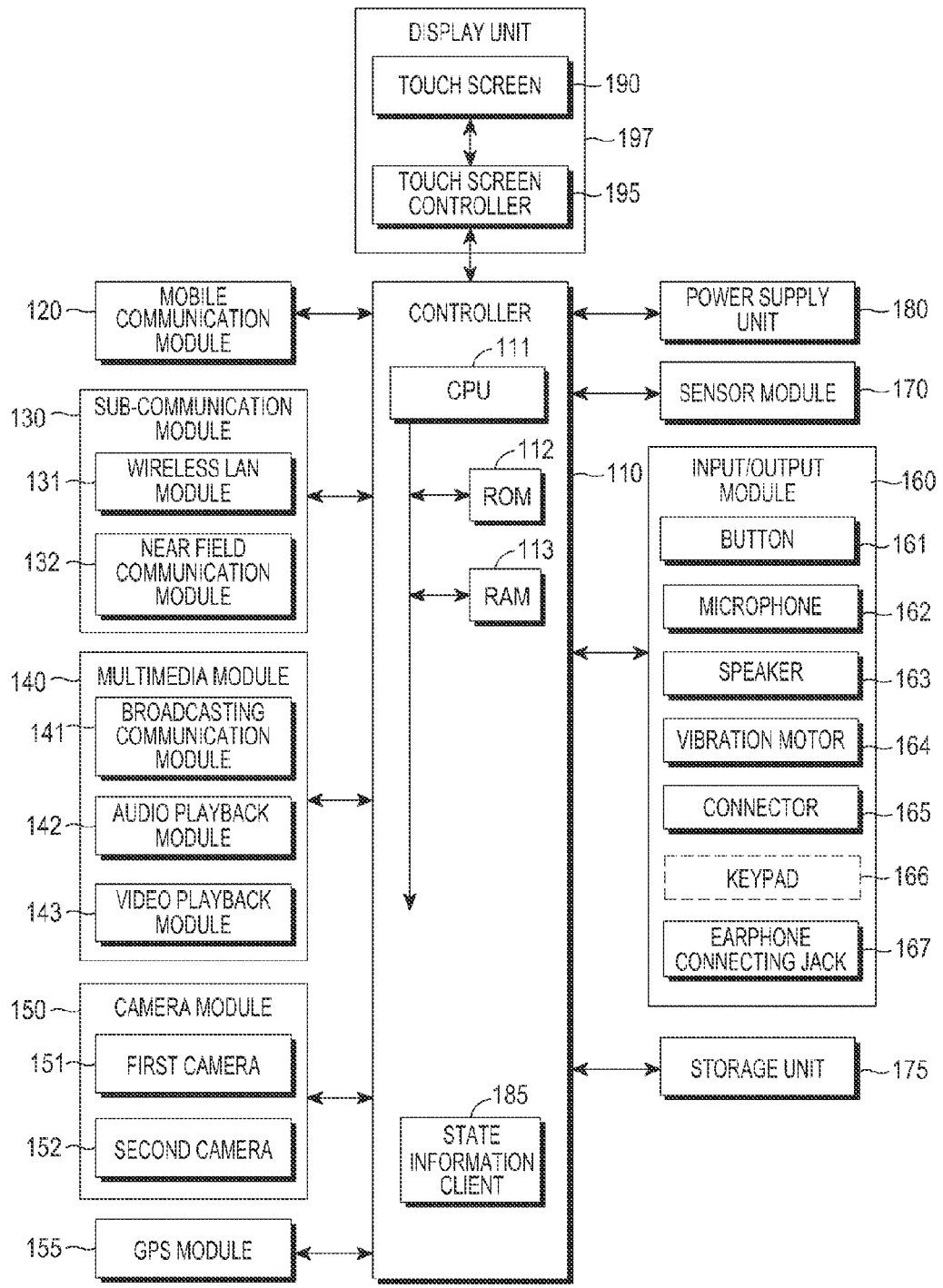
FIG. 4 is a block diagram illustrating a digital apparatus, according to an embodiment of the present invention.

Referring to FIG. 4, a digital apparatus 100 (hereinafter, also referred to as 'apparatus') may be connected with an external device by using a mobile communication module 120, a sub-communication module 130, and a connector 165. The external device includes other devices, such as, for example, a cellular phone, a smart phone, a tablet PC, and a server. Referring to FIG. 4, the apparatus 100 includes a touch screen 190 and a touch screen controller 195. Moreover, the apparatus 100 includes a controller 110, a multimedia module 140, a camera module 150, a Global Positioning System (GPS) module 155, an input/output module 160, a sensor module 170, a power supply unit 180, and a storage unit 175. The apparatus 100 includes at least one of the mobile communication module 120 and the sub-communication module 130. The sub-communication module 130 includes at least one of a wireless LAN module 131 and a near field communication module 132. The multimedia module 140 includes at least one of a broadcasting communication module 141, an audio playback module 142, and a video playback module 143. The camera module 150 includes at least one of a first camera 151 and a second camera 152, and the input/output module 160 includes at least one of a button 161, a microphone 162, a speaker 163, a vibration motor 164, a connector 165, a keypad 166, and an earphone connecting jack 167.

The controller 110 may include a Central Processing Unit (CPU) 111, a (Read Only Memory (ROM) 112 in which control programs for control of the apparatus 100 are stored, and a Random Access Memory (RAM) 113 that stores signals or data input from the outside of the apparatus 100, or is used as a memory area for operations performed in the apparatus 100. The CPU 111 may include a single core, a dual core, a triple core, a quad core, or five or more cores. The CPU 111, the ROM 112, and the RAM 113 may be connected with each other through an internal bus.

The controller 110 may control the mobile communication module 120, the sub-communication module 130, the multimedia module 140, the camera module 150, the GPS module 155, the input/output module 160, the sensor module 170, the power supply unit 180, the storage unit 175, the touch screen 190, and the touch screen controller 195.

The mobile communication module 120 allows the apparatus 100 to be connected with the external device through mobile communication by using at least one antenna under the control of the controller 110. The mobile communication module 120 transmits/receives wireless signals for a voice call, a video call, a Short Message Service (SMS), or a Multimedia Message Service (MMS) to/from a cell phone, a smart phone, a tablet PC, or other devices, having phone numbers which are input to the apparatus 100.

The sub-communication module 130 includes at least one of the wireless LAN module 131, and the near field communication module 132. For example, the sub-communication module 130 may include only the wireless LAN module 131, or only the near field communication module 132. Alternatively, the sub-communication module 130 may include both the wireless LAN module 131 and the near field communication module 132.

The wireless LAN module 131 may be connected to the Internet, at the place where the wireless Access Point (AP) (not shown) is installed, under the control of the controller 110. The wireless LAN module 131 supports a wireless LAN protocol (IEEE802.11x) of the Institute of Electrical and Electronics Engineers (IEEE). The near field communication module 132 may perform near field communication in a wireless manner between the apparatus 100 and an image forming device under the control of the controller 110. The near field communication method may include Bluetooth and Infrared Data Association (IrDA).

The apparatus 100 includes at least one of the mobile communication module 120, the wireless LAN module 131, and the near field communication module 132, according to the performance thereof. For example, the apparatus 100 may include combinations of the mobile communication module 120, the wireless LAN module 131, and the near field communication module 132, according to the performance thereof.

The storage unit 175 may store signals or data, under the control of the controller 110, which is input/output to correspond to operations of the mobile communication module 120, the sub-communication module 130, the multimedia module 140, the camera module 150, the GPS module 155, the input/output module 160, the sensor module 170, the touch screen 190, and a state information client. The storage unit 175 may store control programs for the control of the apparatus 100 or the controller 110, or applications.

The term referred to as "storage unit" is used to define the storage unit 175, the ROM 112 and the RAM 113 in the controller 110, or a memory card mounted to the apparatus 100. Moreover, the ROM 112 and the RAM 113 may be removed in the controller 110, and included in the storage unit 175. The storage unit may include a nonvolatile memory, a volatile memory, a Hard Disk Drive (HDD), or a Solid State Drive (SSD).

The storage unit 175 stores a contact list, according to an embodiment of the present invention. The contact list corresponds to a list for integrally managing user information such as, for example, phone numbers of a user or other users, which have been stored in the digital apparatus 100, and various sorts of communication address. The contact list is constituted of user items corresponding to one or more users included in the contact list. The user items constituting the contact list, according to an embodiment of the present invention, may include a name of the corresponding user, one or more phone numbers, state information of the corresponding user, and user IDs of one or more services to which the corresponding user has subscribed. Moreover, the user items may include an additional communication address, for example, an e-mail address, an IM service ID, an SNS ID, and a cloud service integration ID in addition to the phone number of the corresponding user. Furthermore, the user items may include catalogs of one or more communication services by which communication can be made through the communication addresses (including the phone numbers) included in the user items. For example, when a phone number and an e-mail address are included in user item A, a voice call, a video call, and a short message service may be included in the communication service catalog in correspondence to the phone number. An e-mail service, an IM service of using the corresponding e-mail as an account, and an SNS service may be included in the communication service catalog in correspondence to the e-mail address.

The display unit 197 may provide user interfaces corresponding to various services (for example, telephone calls, data transmission, broadcasting, and photography) to the user. The display unit 197 may include the touch screen 190 and the touch screen controller 195. The touch screen 190 includes a touch panel and a display panel, and the touch panel is mounted on the display panel.

The touch screen controller 195 drives the display panel to display various data input from the controller 110 on the display panel under the control of the controller 110. The display panel may be an LCD panel or an AMOLED panel, and displays various images according to all sorts of operation states of the apparatus 100, execution of applications, and services.

The touch panel corresponds to a panel which may receive an input of at least one touch through various objects, for example, a user's body (for example, fingers including a thumb) or a touchable input unit, for example, an electronic pen (a stylus pen). Moreover, the touch panel may receive a continuous movement of the at least one touch. The touch panel may transmit an analog signal corresponding to a touch trace according to the continuous movement of the input touch to the touch screen controller 195.

In the present invention, the touch is not limited to the contact between the touch screen 190 and the user's body or the touchable input unit, and the touch may include noncontact. The detectable interval on the touch screen 190 may be changed according to the performance or the structure of the apparatus 100. For example, the touch screen 190 may be realized through various manners such as a resistive manner, a capacitive manner, an infrared manner, an Electronic Magnetic Resonance (EMR) manner, or an acoustic wave manner, and may also be realized through one or more combinations thereof. The controller 110 includes a state information client 185. The controller 110 or the state information client 185 of the controller 110 manages state information of the apparatus 100, and generates and processes all sorts of messages necessary for managing the state information. The state information client 185 manages state information of a contact list stored in the apparatus 100.

The state information client 185 performs an operation of registering the apparatus 100 for a state information sharing service. The state information client 185 changes the state information of the apparatus 100 according to a user's request or an operation state of the apparatus 100, and accordingly requests an update of the state information from the state information server 200. The state information client 185 updates state information of another user, which is provided from the contact list server 300, in the corresponding user item of the contact list. Moreover, the state information client 185 of the controller 110 manages the contact list stored in the contact list server 300, or performs an operation for synchronization.

State information corresponds to a user state indicator for transferring whether or not a potential communication counterpart can communicate, or has an intention of communicating, and may include at least one or a plurality of user states. According to an embodiment of the present invention, it is assumed that the state information of the apparatus 100 is divided into a normal state, a busy state, and a no disturbance state.

The normal state represents a state in which a user can perform all sorts of communication such as, for example, a telephone call based communication service and a text based communication service, and accordingly prefers both the telephone call based communication service and the text based communication service. The busy state represents a state in which a user cannot use the telephone call based communication service by which a telephone call is necessary between users, but can use the text based communication service. Specifically, the busy state corresponds to a state in which the user prefers the text based communication service, and does not prefer the telephone call based communication service. For example, the telephone call based communication service may include a voice call and a video call. The text based communication service corresponds to a service of using a text as a medium of communication, and for example, may include a telephone communication based text message service, an IM service, an e-mail service, and an SNS. The no disturbance state represents a state in which a user does not prefer any sort of communication service.

Although the three types of state information are described with respect to an embodiment of the present invention, the state information may also be further subdivided according to another embodiment of the present invention.

The state information of the apparatus 100 may be changed based on one or more of several factors. For example, a user may manually change the state information of the apparatus 100, and the apparatus 100 may also automatically change the state information when a predetermined condition is satisfied. An example in which the state information of the apparatus 100 is changed is described in greater detail below with respect to an embodiment of the present invention.

Although the state information client 185 is included in the controller 110 in the embodiment shown in FIG. 4, the state information client 185 may also be formed as a module separate from the controller 110, according to another embodiment of the present invention. The state information client 185 may be a software module or a hardware module, or a module formed of a combination of software and hardware.

When a state information sharing service application is installed, a state information client 185, according to another embodiment of the present invention, may also be a software module or a function module, which is generated or is functioning in the digital apparatus 100 according to an operation or a signal exchange between the controller 110 and the storage unit 175.

A user registration process and a state information providing process for a state information sharing service in the state information sharing system of FIG. 1 is described with reference to FIGS. 5 to 8.

Figure 5:
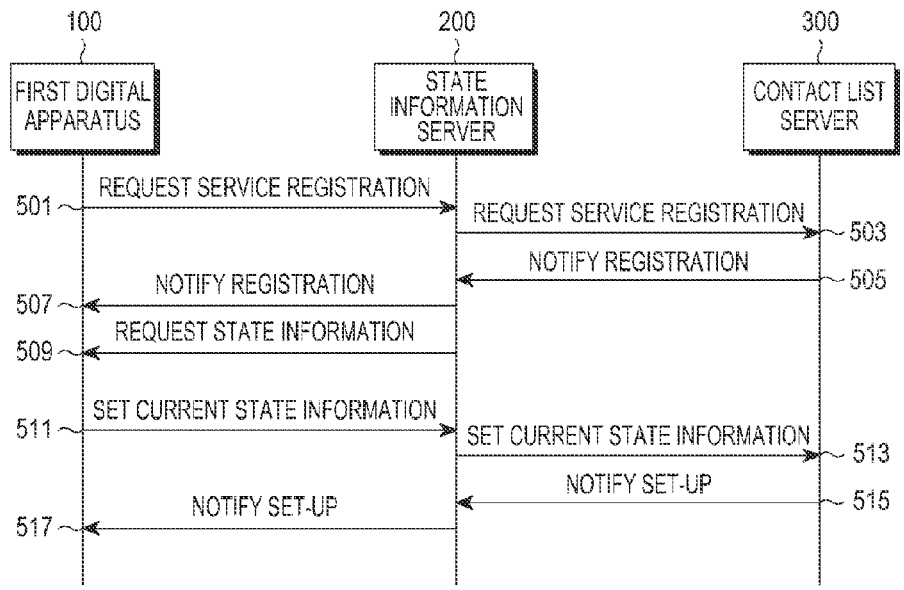
FIG. 5 is a diagram illustrating a state information service registration process, according to an embodiment of the present invention.

FIG. 5 is a diagram illustrating a user registration process for a state information sharing service, according to an embodiment of the present invention. Referring to FIG. 5, the first digital apparatus 100 transmits a service registration request message to the state information server 200, in step 501. User information of the first digital apparatus 100 is included in the registration request message.

The state information server 200 authenticates a user of the first digital apparatus 100 and the first digital apparatus 100. When the authentication is successfully performed, the state information server 200 allots a service user ID for the first digital apparatus 100 and the user, and registers the first digital apparatus 100 and the user in a state information sharing service. In step 503, the state information server 200 transmits a service registration request message for the first digital apparatus 100 and the user to a contact list server 300. The allotted service user ID is included in the service registration request message.

The contact list server 300, having received the service registration request in step 503, registers the first digital apparatus 100 and the user in a state information sharing service, and transmits a registration notification message, which notifying that the service has been completely registered to the state information server 200, in step 505. When receiving the registration notification message in step 505, the state information server 200 transmits a registration completion notification message including the service user ID allotted to the digital apparatus 100 to the first digital apparatus 100, in step 507.

The state information server 200 transmits an initial state information request message requesting a contact list and state information to the first digital apparatus 100, in step 509. Accordingly, the first digital apparatus 100 transmits a set-up message, including a contact list stored in the storage unit 175 and current state information of the first digital apparatus 100, to the state information server 200, in step 511. When receiving the contact list and the state information from the first digital apparatus 100, the state information server 200 sets state information of the digital apparatus 100. The state information server 200 transmits a set-up message including the contact list and the state information, which have been received, to the contact list server 300 to request a state information set-up from the contact list server 300, in step 513. The contact list server 300 stores the contact list to correspond to the first digital apparatus 100, and sets the state information of the first digital apparatus 100. When the set-up is completed, the contact list server 300 transmits a set-up notification message of representing completion of the set-up to the state information server 200, in step 515. Accordingly, the state information server 200 transmits a set-up notification message representing completion of the set-up to the first digital apparatus 100, in step 517.

A user item and a contact address included in the contact list stored in the first digital apparatus 100 may be changed according to an input of the user. Thus, every time the contact list is changed, the first digital apparatus 100 transmits the changed contact list to the state information server 200, and the state information server 200 and the contact list server 300 may renew the contact list. Moreover, the first digital apparatus 100 transmits the contact list to the state information server 200 at every predetermined period, according to another embodiment of the present invention, and thus, the state information server 200 and the contact list server 300 may also renew the contact list. Furthermore, when the user requests an update of the contact list, the first digital apparatus 100 transmits the contact list to the state information server 200, and thus, the state information server 200 and the contact list server 300 may renew the contact list according to another embodiment of the present invention.

After the service registration of the first digital apparatus 100 is completed, as described above, the state information server 200 collects and updates the state information of the first digital apparatus 100, and notifies users included in the contact list corresponding to the first digital apparatus 100 of the updated state information of the first digital apparatus 100. Embodiments of the present invention propose three manners of notification for the state information, specifically, a proactive manner, an on demand manner, and a hybrid manner.

According to an embodiment of the present invention, when the state information is changed, all digital apparatuses having subscribed to the state information sharing service actively transmit their state information to the state information server 200, and the state information server 200 and the contact list server 300 update the state information of the corresponding digital apparatus according to reception of the state information in real time. The updated state information is notified to the corresponding digital apparatus by the contact list server 300 through at least one of the proactive manner, the on demand manner, and the hybrid manner, according to an embodiment of the present invention.

In the proactive manner, the contact list server 300 notifies the users, which are included in the contact list of the first digital apparatus 100, of the updated state information of the specific apparatus, for example, the updated state information of the first digital apparatus 100, in real time. The digital apparatus on which the state information is targeted need not separately request state information of another person's digital apparatus.

In the on demand manner, the contact list server 300 does not transmit the updated state information of the updated specific apparatus to the related digital apparatus in real time, and provides state information of a user included in the contact list corresponding to the digital apparatus having requested the state information, when a request for the state information is received from the digital apparatus.

In the hybrid manner, the contact list server 300 does not transmit the updated state information of the updated specific apparatus to the related digital apparatus in real time, and provides state information of a user included in the contact list to a digital apparatus entering an active state in the on demand manner, at a time when the digital apparatus enters the active state. Thereafter, the contact list server 300 provides the state information in the proactive manner until the digital apparatus enters a dormant state, and does not provide the state information when the digital apparatus enters the dormant state.

Figure 6:
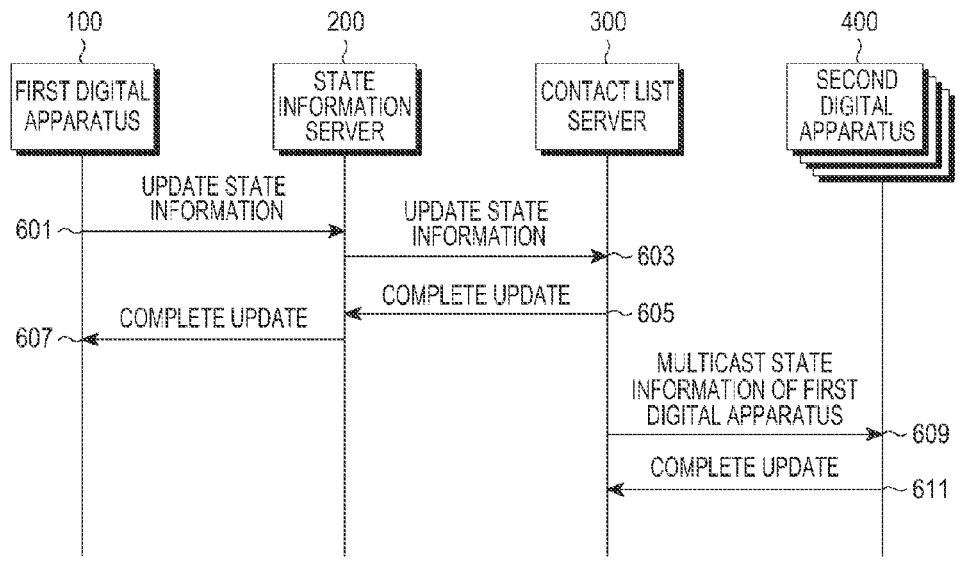
FIGS. 6 to 8 are diagrams illustrating state information updating processes, according to embodiments of the present invention.
Figure 7:
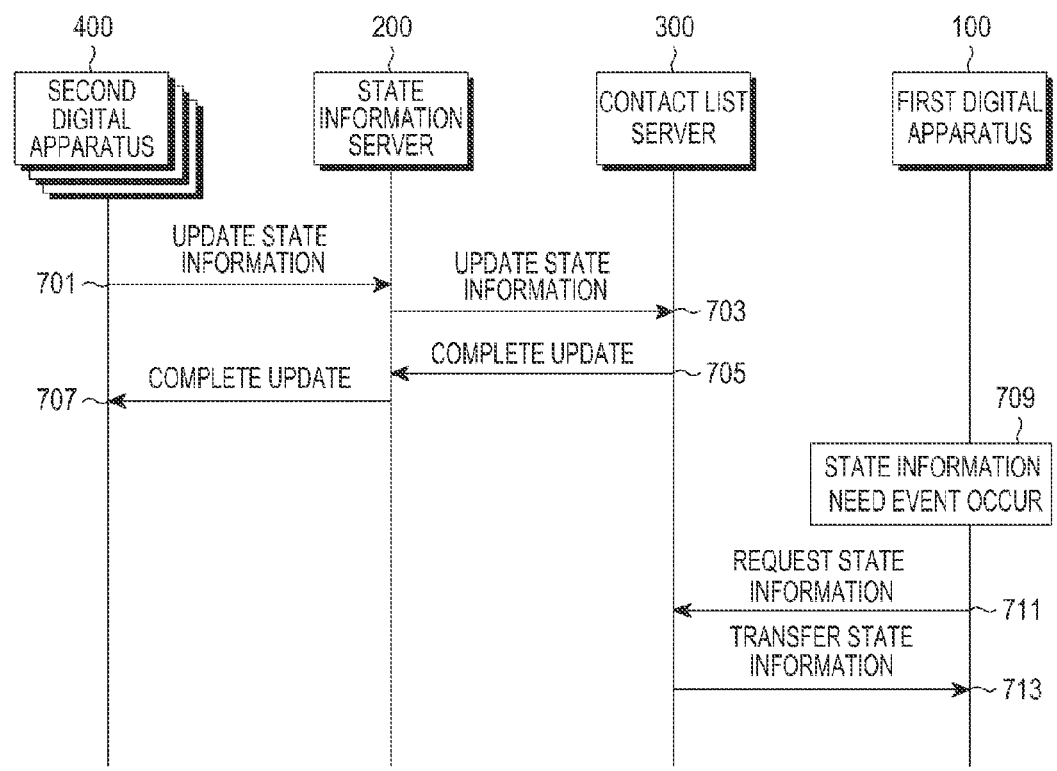
Figure 8:
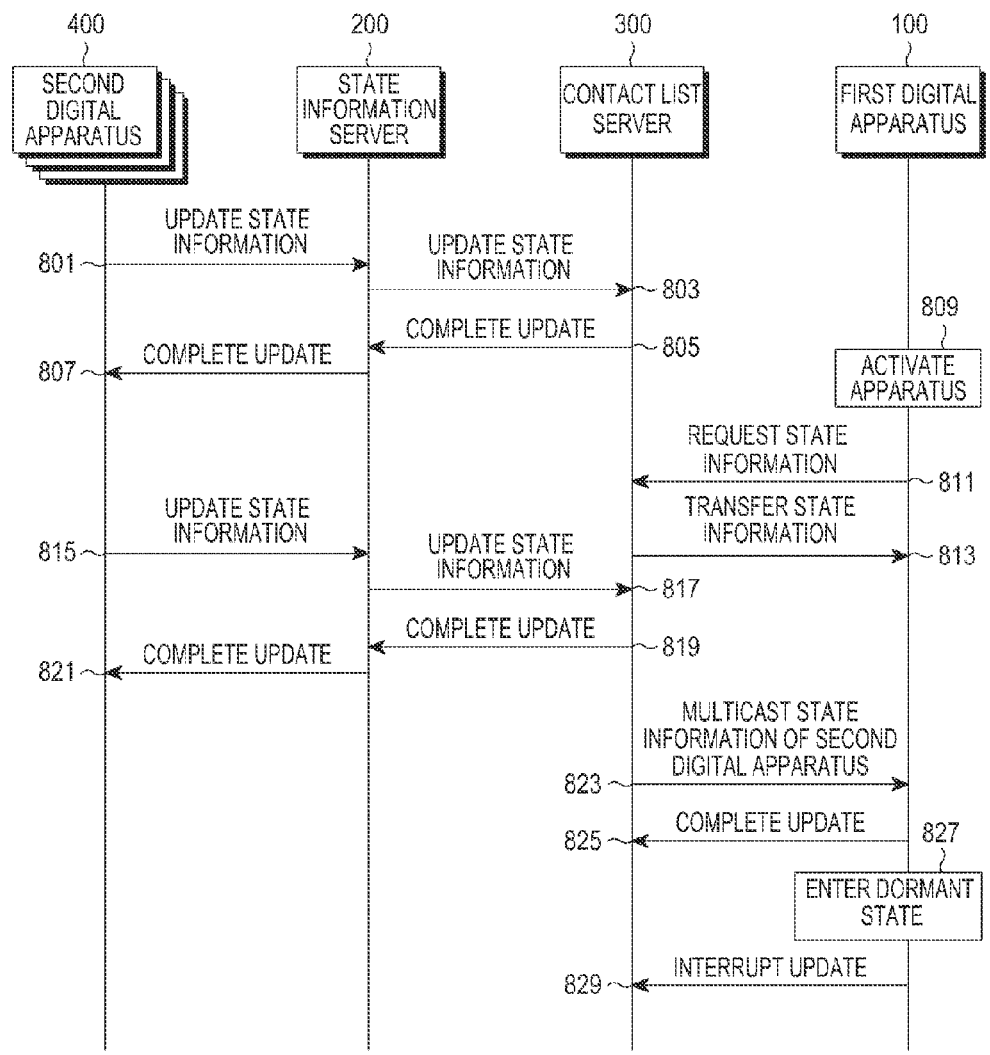

An embodiment of the proactive manner is illustrated in FIG. 6, an embodiment of the on demand manner is illustrated in FIG. 7, and an embodiment of the hybrid manner is illustrated in FIG. 8.

In the embodiment of the present invention illustrated in FIG. 6, it is assumed that a first digital apparatus 100 and a second digital apparatus 400 are registered in a state information sharing service, according to the process shown in FIG. 5. The second digital apparatus 400 corresponds to a digital apparatus of a user included in a contact list of the first digital apparatus 100.

Referring to FIG. 6, the first digital apparatus 100 actively transmits an update message, which requests an update of state information, to the state information server 200, in step 601, when the state information thereof is changed. A service user ID and current state information of the first digital apparatus 100 are included in the update message.

The state information server 200 changes a stored state information of the first digital apparatus 100 to new state information of the first digital apparatus 100, which is included in the update message having been received in step 601, thereby updating the state information of the first digital apparatus 100. The state information server 200 transmits an update message, which requests an update of state information for the first digital apparatus 100, to the contact list server 300, in step 603. The service user ID and the state information of the first digital apparatus 100 are included in the update message of step 603.

The contact list server 300 changes state information of the first digital apparatus 100, which has been stored therein, to the state information received in step 603, in response to the request of step 603 to update state information of the first digital apparatus 100. When the state information is completely updated, the contact list server 300 transmits a notification message, which notifies the state information server 200 of completion of the update, to the state information server 200, in step 605.

When receiving the notification message in step 605, the state information server 200 transmits a notification message, which notifies the first digital apparatus 100 of completion of the update, to the first digital apparatus 100, in step 607.

After transmitting the notification message in step 605, the contact list server 300 searches for a contact list of the first digital apparatus 100 by using the service user ID of the first digital apparatus 100. When the contact list is discovered, the contact list server 300 multicasts the updated state information of the first digital apparatus 100 to users included in the discovered contact list. Specifically, the contact list server 300 constitutes and transmits a state information message including the state information and the service user ID of the first digital apparatus 100 to a digital apparatus of each user included in the discovered contact list, or the second digital apparatus 400.

The second digital apparatus 400 having received the state information message in step 609 searches for the corresponding user item in the contact list stored therein by using the service user ID included in the state information message. The second digital apparatus 400 changes state information corresponding to the discovered user item to the state information included in the state information message. Thereafter, the second digital apparatus 400 transmits a report message, which reports completion of the state information update, to the contact list server 300, in step 611.

In the embodiment of the proactive manner illustrated in FIG. 6, it is assumed that the second digital apparatus 400 has been registered in the state information sharing service. However, according to another embodiment of the present invention, even if the second digital apparatus 400 is included in the contact list of the first digital apparatus 100 but is not registered in the state information sharing service, the second digital apparatus 400 may be provided with the state information of the first digital apparatus 100. In this case, the contact list server 300 may additionally include a phone number of the first digital apparatus 100 in the state information message. The contact list server 200 designates a target address of the state information message as a phone number of the second digital apparatus 400 to transmit the state information message to the second digital apparatus 400.

When receiving the state information message, the second digital apparatus 400 searches for the corresponding user item in the contact list stored therein by using the phone number of the first digital apparatus 100 included in the state information message. The second digital apparatus 400 changes state information corresponding to the discovered user item to the state information included in the state information message. When failing to discover the phone number of the first digital apparatus 100 in the contact list stored therein, the second digital apparatus 400 updates the contact list by requesting the state information of the first digital apparatus 100 through the contact list server 300 or the state information server 200, and then may also search for the user item again.

A process of transferring state information in an on demand manner is described with reference to FIG. 7. In an embodiment of the present invention illustrated in FIG. 7, it is assumed that the first digital apparatus 100 and the second digital apparatus 400 are registered in a state information sharing service, according to the process shown in FIG. 5, and the second digital apparatus 400 corresponds to a digital apparatus of a user included in a contact list of the first digital apparatus 100.

Referring to FIG. 7, the second digital apparatus 400 actively transmits an update message, which requests an update of state information, to the state information server 200, in step 701, when the state information thereof is changed. A service user ID and current state information of the second digital apparatus 200 are included in the update message.

The state information server 200 changes the stored state information of the second digital apparatus 400 to state information of the second digital apparatus 400, which is included in the update message received in step 701, thereby updating the state information of the second digital apparatus 400. The state information server 200 transmits an update message, which requests an update of state information for the second digital apparatus 400, to a contact list server 300, in step 703. The service user ID and the state information of the second digital apparatus 400 are included in the update message of step 703.

The contact list server 300 changes state information of the second digital apparatus 400, which has been stored therein, to the state information received in step 703, in response to the request of step 703 to update state information of the second digital apparatus 400, and when the state information is completely updated, transmits a notification message, which notifies the state information server 200 of completion of the update, to the state information server 200, in step 705.

When receiving the notification message in step 705, the state information server 200 transmits a notification message, which notifies the second digital apparatus 400 of completion of the update, to the second digital apparatus 400, in step 707.

The first digital apparatus 100 determines that a state information need event has occurred, in step 709. The state information need event corresponds to an event occurring in the first digital apparatus 100 when a function or an operation using state information of users included in the contact list is performed.

For example, the state information need event may occur when a contact list display request is input from a user to the first digital apparatus 100.

When a user's request is input for execution of an application using state information of each user item and a communication address stored in the user item, which have been included in the contact list, the state information need event may occur. For example, when a request is input for execution of an IM service using an e-mail address included in the contact list, the state information need event may occur. Moreover, in a case where information of a counterpart user with whom a user wants to communicate is required, like when a telephone call application is executed, information of the counterpart user is searched for transmission of a text message, or the counterpart user (or an item of the counterpart user) is designated, the state information need event may occur.

When the state information need event occurs, the first digital apparatus 100 transmits a state information request message to the contact list server 300, in step 711. The service user ID of the first digital apparatus 100 is included in the state information request message.

When receiving the state information request message, the contact list server 300 searches for the contact list corresponding to the service user ID included in the state information request message. Specifically, the contact list server 300 searches for the contact list of the first digital apparatus 100. The contact list server 300 generates a state information message including service user IDs and state information corresponding to one or more users included in the discovered contact list. The contact list server 300 transmits the generated state information message to the first digital apparatus 100, in step 713.

The first digital apparatus 100, having received the state information message in step 713, searches for the corresponding user item in the contact list stored therein through the service user ID included in the state information message. The second digital apparatus 400 changes state information corresponding to the discovered user item to the corresponding state information included in the state information message. Through the above-described process, the first digital apparatus 100 updates the state information of the one or more users included in the contact list. The first digital apparatus 100 transmits a report message, which reports completion of the state information update to the contact list server 300.

A process of transferring state information in a hybrid manner is described with reference to FIG. 8. In an embodiment of the present invention illustrated in FIG. 8, it is assumed that the first digital apparatus 100 and the second digital apparatus 400 are registered in a state information sharing service, according to the process shown in FIG. 5, and the first digital apparatus 100 and the second digital apparatus 400 correspond to digital apparatuses of users included in mutual contact lists, respectively.

Referring to FIG. 8, the second digital apparatus 400 actively transmits an update message, which requests an update of state information, to a state information server 200, in step 801, when the state information thereof is changed. A service user ID and current state information of the second digital apparatus 400 are included in the update message.

The state information server 200 changes the stored state information of the second digital apparatus 400 to state information of the second digital apparatus 400, which is included in the update message having been received in step 801, thereby updating the state information of the second digital apparatus 400. The state information server 200 transmits an update message of requesting an update of state information for the second digital apparatus 400 to a contact list server 300, in step 803. The service user ID and the state information of the second digital apparatus 400 are included in the update message of step 803.

The contact list server 300 changes state information of the second digital apparatus 400, which has been stored therein, to the state information received in step 803, in response to the request of step 803 to update state information of the second digital apparatus 400. When the state information is completely updated, the contact list server 300 transmits a notification message, which notifies the state information server 200 of completion of the update, to the state information server 200, in step 805.

When receiving the notification message in step 805, the state information server 200 transmits a notification message, which notifies the second digital apparatus 400 of completion of the update, to the second digital apparatus 400, in step 807.

The first digital apparatus 100 is activated, in step 809. For example, when the first digital apparatus 100 is powered on, or the first digital apparatus 100 corresponds to a smart phone or a tablet PC, the activated state implies an unlocked state. When being activated, the first digital apparatus 100 transmits a state information request message to the contact list server 300, in step 811. The service user ID of the first digital apparatus 100 is included in the state information request message.

When receiving the state information request message, the contact list server 300 searches for the contact list corresponding to the service user ID included in the state information request message. Specifically, the contact list server 300 searches for the contact list of the first digital apparatus 100. The contact list server 300 generates a state information message including service user IDs and state information corresponding to users included in the discovered contact list. The contact list server 300 transmits the generated state information message to the first digital apparatus 100, in step 813.

The first digital apparatus 100, having received the state information message in step 813, searches for the corresponding user item in the contact list stored therein through the service user ID included in the state information message. The second digital apparatus 400 changes state information corresponding to the discovered user item to the corresponding state information included in the state information message to update the state information of a plurality of users included in the contact list. The first digital apparatus 100 transmits a report message of reporting completion of the state information update to the contact list server 300.

As the user state of the apparatus is changed, the second digital apparatus 400 may transmit an update message, which requests a state information update, to the state information server 200, in step 815.

The state information server 200 changes the stored state information of the second digital apparatus 400 to the state information of the second digital apparatus 400, which is included in the update message having been received in step 815, updating the state information of the second digital apparatus 400. The state information server 200 transmits an update message, which requests a state information update for the second digital apparatus 400, to the contact list server 300, in step 817.

The contact list server 300 changes the state information of the second digital apparatus 400 having been stored therein to the state information received in step 815 in response to the request of step 817, updating the state information of the second digital apparatus 400. When the state information is completely updated, the contact list server 300 transmits a notification message, which notifies the state information server 200 of completion of the update, to the state information server 200, in step 819. When receiving the notification message, the state information server 200 transmits a notification message, which notifies the second digital apparatus 400 of completion of the update, to the second digital apparatus 400, in step 821.

After transmitting the notification message in step 819, the contact list server 300 searches for a contract list of the second digital apparatus 400 by using the service user ID of the second digital apparatus 400. When the contact list is discovered, the contact list server 300 multicasts the updated state information of the second digital apparatus 400 to users included in the discovered contact list in step 823. Specifically, the contact list server 300 constitutes and transmits a state information message, including the state information and the service user ID of the second digital apparatus 400, to a digital apparatus of each user included in the discovered contact list, or the first digital apparatus 100.

The first digital apparatus 100, having received the state information message in step 823, searches for the corresponding user item in the contact list stored therein by using the service user ID included in the state information message. The first digital apparatus 100 changes state information corresponding to the discovered user item to the state information included in the state information message. Thereafter, the first digital apparatus 100 transmits a report message of reporting completion of the state information update to the contact list server 300, in step 825.

Then, the first digital apparatus 100 enters a dormant state in step 827. For example, when the first digital apparatus 100 corresponds to a smart phone or a tablet PC, the first digital apparatus 100 is converted into a screen lock state. Accordingly, the first digital apparatus 100 transmits an update interruption message to the contact list server 300, in step 829. The service user ID of the first digital apparatus 100 is included in the update interruption message.

When receiving the update interruption message, the contact list server 300 ceases transmission of the state information message to the first digital apparatus 100. When a state information request message is received from the first digital apparatus 100, state information message transmission to the first digital apparatus 100 is restarted.

A method, according to an embodiment of the present invention, is described in which digital apparatuses 100 and 400 change state information thereof, and display state information of each user included in contact lists stored in the digital apparatuses 100 and 400. Although the first digital apparatus 100 is described below, the method may be similarly applied to other digital apparatuses.

The state information proposed in embodiments of the present invention corresponds to information for representing a representative state of a user using the first digital apparatus 100, and may be compatible with IM state information used in an IM service. Accordingly, a relationship is set between the state information of the first digital apparatus 100 and the IM state information, so that when the IM state information is changed, the state information of the first digital apparatus 100 is also changed to the corresponding state information. The IM state information is changed by a user in a state where the IM service is executed, or is automatically changed when a preset specific condition is satisfied.

The state information proposed in embodiments of the present invention corresponds to a notification mode of the first digital apparatus 100. Thus, when the notification mode is changed, the state information may also be converted into state information corresponding to the changed notification mode.

A notification mode of the first digital apparatus 100 refers to an operation mode of the first digital apparatus 100, for informing a user that an event of which the first digital apparatus 100 should notify a user, specifically, a notification event, occurs. For example, the notification event may occur at a time of call reception or message reception according to communication services, or when push messages of various applications installed in the first digital apparatus 100 are received. Alternatively, the notification event may also occur according to an internal operation of the first digital apparatus 100, such as a schedule of a user or an alarm registered in the first digital apparatus 100, or occurrence of push messages of various applications installed in the first digital apparatus 100.

The notification mode of the first digital apparatus 100 may be divided into a ring tone mode, a vibration mode, and a silent mode. The ring tone mode corresponds to an operation mode of informing of an occurrence of the notification event by playing a preset audio. The vibration mode corresponds to an operation mode of informing of an occurrence of the notification event by generating a vibration according to a preset vibration pattern. The silent mode corresponds to an operation mode of informing of an occurrence of the notification event through, not an audio or a vibration, but lighting of a lamp when the lamp is mounted to the first digital apparatus 100. If the lamp has not been mounted to the first digital apparatus 100, the first digital apparatus 100 may display only a message for informing of the occurrence of the notification event, or may not perform a separate operation in the silent mode. The first digital apparatus 100 may also display a message for guiding the occurrence of the notification event, or notification contents according to settings/options in the ring tone mode, the vibration mode, and the silent mode.

The notification mode of the first digital apparatus 100 may be directly changed and set by a user through a selection input or an operation button for the related menu, or may also be automatically changed and set when a specific condition preset in the first digital apparatus 100 is satisfied. For example, when a user registers a time range when a specific alarm mode is set in the first digital apparatus 100, the first digital apparatus 100 automatically sets the corresponding alarm mode at the corresponding time range.

Table 1 shows a correlation between state information, a notification mode, and IM state information of an IM service.

TABLE 1

| State information | Notification mode | IM state information | Meaning |
| --- | --- | --- | --- |
| Normal state | Ring tone mode | Conversation-possible state | Telephone call available, Text based communication service available |
| Busy state | Vibration mode | Random conversation-possible state (Busy, In conference, In class) | Telephone call unavailable, Text based communication service available |
| No disturbance state | Silent mode | Conversation-unavailable state (Driving, Movie Watching, Sleeping) | Telephone call unavailable, Text based communication service unavailable |

Referring to Table 1, the normal state of the first digital apparatus 100, the ring tone mode, and the conversation-possible state among the IM state information correspond to each other. The busy state, the vibration mode, and the random conversation-possible state correspond to each other. For example, the random conversation-possible state may include a busy state, an in-conference state, and an in-class state. The no disturbance state, the silent mode, and the conversation-unavailable state among the IM state information correspond to each other. For example, the conversation-unavailable state may include a driving state, a movie watching state, and a sleeping state.

When the notification mode is changed, the state of the first digital apparatus 100 is changed to the related state, and the IM state is also changed to the corresponding state, according to an embodiment of the present invention. For example, when the ring tone mode is currently set, the state of the first digital apparatus 100 corresponds to the normal state, and the IM state information corresponds to the conversation-possible state. When the IM state information is changed to the busy state or the in-conference state in this state, the state of the first digital apparatus 100 is converted into the busy state, and the notification mode is also converted into the vibration mode. Alternatively, when the alarm mode is changed to the silent mode, the state of the first digital apparatus 100 is converted into the no disturbance state, and the IM state is changed to the conversation-unavailable state.

When a state conversion event, requiring a state conversion of the first digital apparatus 100, occurs, the first digital apparatus 100 properly converts the state of the first digital apparatus 100, according to an embodiment of the present invention. The state conversion event may occur in different situations. According to an embodiment of the present invention, the state conversion event is categorized as one of a compulsorily automatic conversion event, a manual conversion event, a selectively semiautomatic conversion event, and a situation recognition automatic conversion event.

When an interruption situation is managed on an interruption list, and the situation included in the interruption list occurs, the compulsorily automatic conversion event occurs. When the compulsorily automatic conversion event occurs, the first digital apparatus 100 is converted into the no disturbance state. When the interruption situation is completed, the first digital apparatus 100 returns to the previous state information.

The interruption situation, which is to be included in the interruption list, may be selected by a user. For example, the interruption situation may include execution of a telephone communication service in want of a telephone call of the first digital apparatus 100, driving of the first digital apparatus 100 using an external accessory device, and execution of a specific application. Providing a service other than the corresponding communication service, or executing an application other than the specific application may be limited or interrupted. For example, the telephone communication service in want of the telephone call may be a mobile phone service, a video phone service, an Internet phone service, and wired telephone service. The driving of the first digital apparatus 100 using the external accessory device corresponds to a situation in which the first digital apparatus 100 is connected to a specific external device in a wired/wireless or specific connection manner (for example, a manner of using a sound or a touch), or drives a specific function in conjunction with the connected external accessory device. For example, the interruption situation may be a situation in which a blood pressure measuring application is executed in the first digital apparatus 100, and the first digital apparatus 100 is connected to a blood pressure measuring device interlocked therewith such that a blood pressure measuring operation is performed. The interruption situation may also be a situation in which a remote controller application is executed in the first digital apparatus 100, and the first digital apparatus 100 is connected to a radio control toy car interlocked therewith, such that the radio control toy car is controlled through the first digital apparatus 100. Moreover, the specific application may be an application designated by a user.

The manual conversion event occurs when a user manually converts the notification mode, or manually changes the IM state. Alternatively, the manual conversion event may occur by a user's input through a state conversion menu for changing the state information.

The selectively semiautomatic conversion event occurs when an application, which a user has designated, is executed. Accordingly, the first digital apparatus 100 stores a selection list including the application, which the user has designated, and state information corresponding to the application. When it is detected that the selectively semiautomatic conversion event, application A included in the selection list, has been executed, the first digital apparatus 100 is converted into a predetermined state in correspondence to application A. When application A is completely executed, the first digital apparatus 100 returns to the previous state information.

The situation recognition automatic conversion event occurs according to a current use manner and situation of the first digital apparatus 100. Accordingly, the first digital apparatus 100 stores a conversion list including at least one conversion situation and correspondence state, and is converted into the corresponding state when it is determined through an analysis of the current use manner and situation for the first digital apparatus 100 that the current situation has corresponded to the conversion situation included in the list. When the conversion situation is completed, the first digital apparatus 100 returns to the previous state information.

For example, the conversion situation may be user absence, vehicle driving, sleeping, performance viewing, a conference, or a specific category of application. The first digital apparatus 100 determines whether or not the current situation corresponds to the conversion situation through monitoring operations of different types of function modules included in the apparatus 100, a schedule registered in the apparatus 100, and a morning alarm.

A user may select an event that will be effectively processed among the compulsorily automatic conversion event, the manual conversion event, the selectively semiautomatic conversion event, and the situation recognition automatic conversion event. Specifically, the apparatus 100 is configured such that the effective event is selected through a menu among the compulsorily automatic conversion event, the manual conversion event, the selectively semiautomatic conversion event, and the situation recognition automatic conversion event, and only the event selected by a user is effectively processed.

The state conversion events are prioritized in an order of compulsorily automatic conversion event, manual conversion event, selectively semiautomatic conversion event, and situation recognition automatic conversion event. Specifically, the remaining types of state conversion events occurring while the state information is maintained by the compulsorily automatic conversion event are neglected. When the manual conversion event occurs while the state information is maintained by the selectively semiautomatic conversion event or the situation recognition automatic conversion event, the state information through the manual conversion event is preferentially set. The situation recognition automatic conversion event occurring while the state information is maintained by the selectively semiautomatic conversion event is neglected. Moreover, when the compulsorily automatic conversion event, the manual conversion event, or the selectively semi-automatic conversion event occurs while the state information is maintained by the situation recognition automatic conversion event, a state information conversion is performed by the corresponding event. Furthermore, it should be understood that the state conversion event may be differentiated in various manners in addition to the above-described manner, or the events may also be configured through integration or modification of at least some events.

Figure 9:
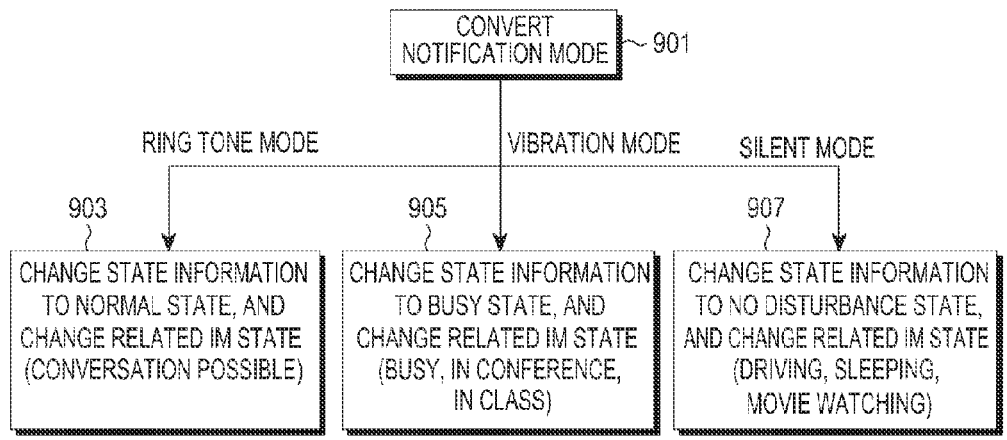
FIGS. 9 to 11 are diagrams illustrating user state conversion processes, according to embodiments of the present invention.
Figure 10:
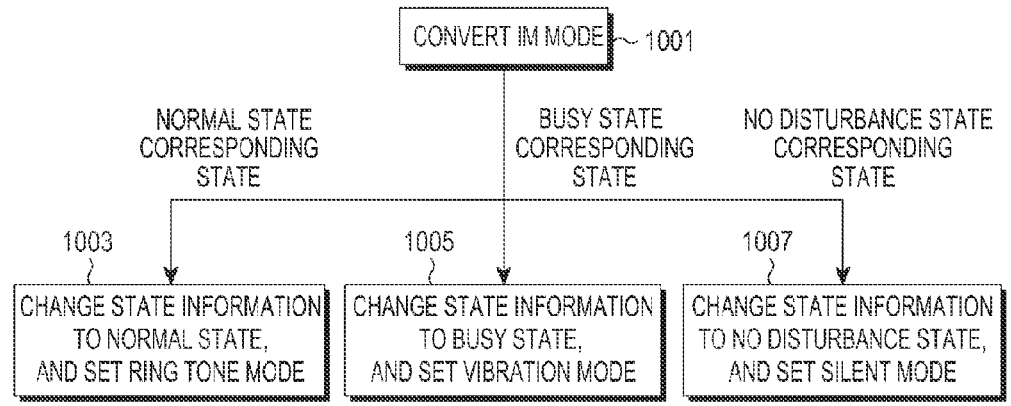
Figure 11:
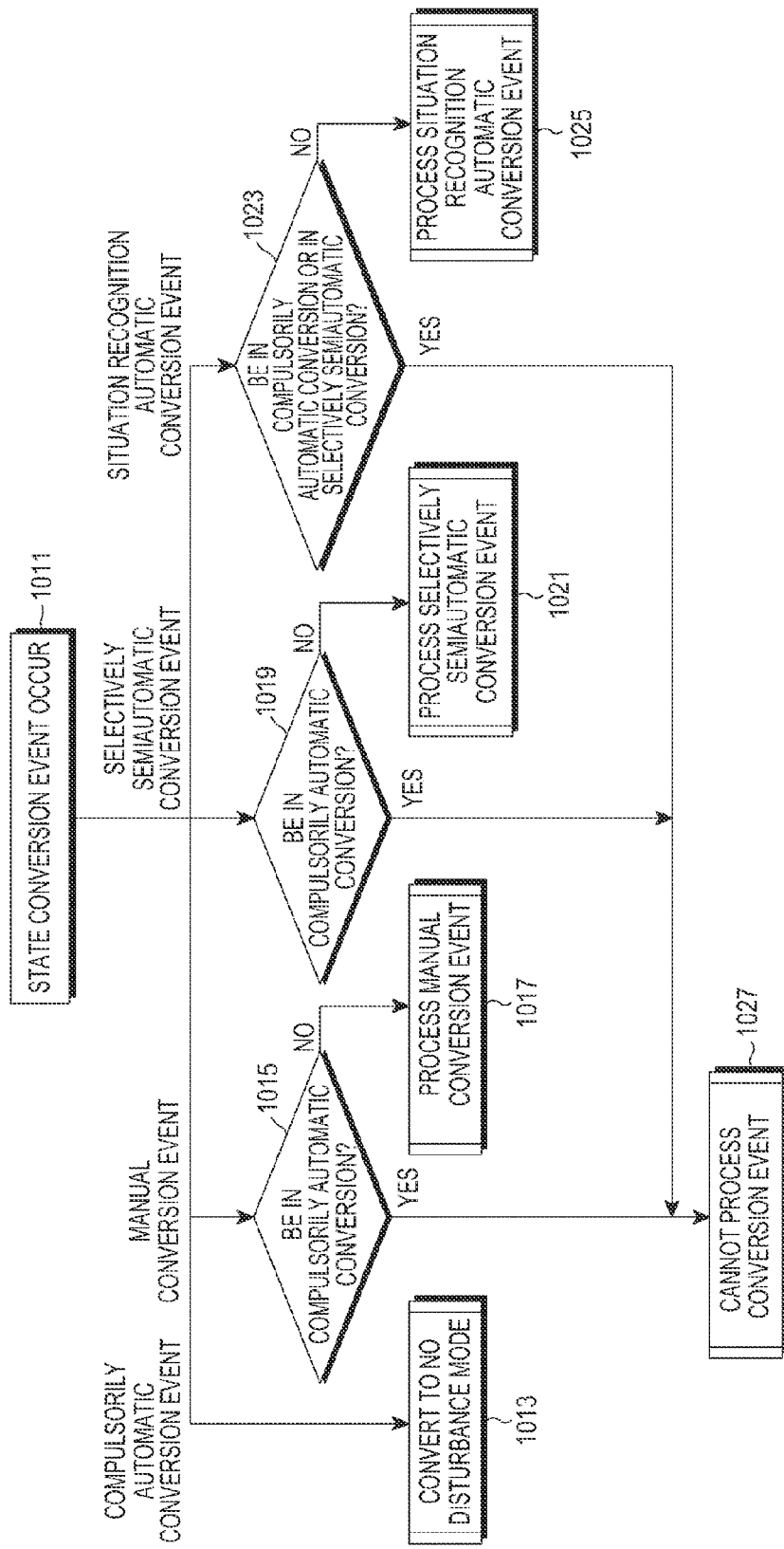

Hereinafter, operation processes of the first digital apparatus 100, in cases where the state conversion events occur, will be described with reference to FIGS. 9 to 11. FIGS. 9 and 10 are diagrams illustrating operation processes in cases of a notification mode conversion and an IM state conversion, when a manual conversion event occurs. FIG. 11 is a diagram illustrating a processing process in a case where various state conversion events occur.

The operation process of the first digital apparatus 100 in the case in which the notification mode is changed, is described with reference to FIG. 9. It is assumed in the embodiment of FIG. 9 that a conversion into a notification mode different from the previously set notification mode is requested.

Referring to FIG. 9, when receiving a request for a notification mode conversion from a user, for example, a controller 110 of the first digital apparatus 100 transfers an indication that a manual conversion event has occurred to the state information client 185 thereof, and sets the requested notification mode, in step 901. The request for the notification mode conversion may occur by a user's input through a menu for the notification mode conversion, or a user's manipulation of a notification mode conversion button. When the notification mode having been converted in step 901 corresponds to a ring tone mode, the state information client 185 sets state information as a normal state, and IM state information as a conversation-possible state, in step 903. The state information client 185 transmits an update message of requesting that state information should be updated to a normal state to a state information sever 200.

When the notification mode having been converted in step 901 corresponds to a vibration mode, the state information client 185 changes state information to a busy state, and IM state information to any one of random conversation-possible states, in step 905. For example, the state information client 185 changes the state information to a state randomly selected from a busy state, an in-conference state, and an in-class state, or a high priority state. The state information client 185 transmits an update message, which requests that state information should be updated to a busy state, to the state information sever 200.

Alternatively, when the notification mode having been converted in step 901 corresponds to a silent mode, the state information client 185 changes state information to a no disturbance state, and IM state information to any one of conversation-unavailable states, in step 907. For example, the state information client 185 changes the state information to a state randomly selected from a driving state, a sleeping state, and a movie watching state, or a high priority state. The state information client 185 transmits an update message, which requests that state information should be updated to a no disturbance state, to a state information sever 200.

An operation process of the first digital apparatus 100 in the case in which an IM state is changed is described with reference to FIG. 10. It is assumed in the embodiment of FIG. 10 that a conversion into an IM state different from a previously set IM state is requested.

Referring to FIG. 10, when receiving a request for an IM state conversion from a user, a controller 110 of the first digital apparatus 100 transfers the indication that a manual conversion event has occurred to the state information client 185, in step 1001. The state information client 185 sets the requested IM state. The request for the IM state conversion may occur by a user's input through a menu for the IM state conversion. When the IM state having been converted in step 1001 corresponds to a conversation-possible state, the state information client 185 changes state information to a normal state, and sets a ring tone mode in conjunction with the controller 110, in step 1003. The state information client 185 transmits an update message, which requests that state information should be updated to a normal state, to state information sever 200.

When the IM state having been converted in step 1001 corresponds to any one of random conversation-possible states, the state information client 185 changes state information to a busy state under the control of the controller 110, and sets a vibration mode in conjunction with the controller 110, in step 1005. The state information client 185 transmits an update message, which requests that state information should be updated to a busy state, to the state information sever 200.

When the IM state having been converted in step 1001 corresponds to any one of conversation-unavailable states, the state information client 185 changes state information to a no disturbance state, and sets a silent mode in conjunction with the controller 110, in step 1007. The state information client 185 transmits an update message, which requests that state information should be updated to a no disturbance state, to the state information sever 200.

In the above-described embodiments of FIGS. 9 and 10, the processes of converting the state information when the user directly changes the notification mode or the IM state have been described. As described above, it can be understood that the notification mode is also changed when the state information is converted according to the manual conversion event. However, when at least one of the compulsorily automatic conversion event, the selectively semiautomatic conversion event, and the situation recognition automatic conversion event occurs through executing an application, and the state information is changed according to that execution, the notification mode is not changed. When the corresponding application is completely executed, the state information is converted into the previous state information again.

An operation process of the first digital apparatus 100, according to an occurrence of various state conversion events, is described with reference to FIG. 11. It is assumed in the embodiment of FIG. 11 that a conversion into a state different from a state having been previously set in the first digital apparatus 100 is requested.

Referring to FIG. 11, the controller 110 and the state information client 185 of the first digital apparatus 100 determine that a state conversion event has occurred, in step 1011. The controller 110 and the state information client 185 perform different control operations according to the type of state conversion event that has occurred.

The state information client 185 determines that a compulsorily automatic conversion event has occurred in step 1011, and sets a no disturbance state, in step 1013, when an operation corresponding to an interruption situation included in an interruption list is performed in the first digital apparatus 100. If a current state corresponds to the no disturbance state, the no disturbance state is maintained as it is.

For example, when a telephone call is received or sent to/from the first digital apparatus 100 so that a telephone communication service in want of the telephone call is executed, the state information client 185 may determine that an operation of the first digital apparatus 100 corresponds to an interruption situation included in the interruption list. Alternatively, as an application included in the interruption list is executed, the state information client 185 may determine that an operation of the first digital apparatus 100 corresponds to an interruption situation included in the interruption list.

When changing the state information, the state information client 185 transmits an update message, which requests that state information should be updated to a no disturbance state, to a state information server 200, in step 1013. Moreover, if the state information is not changed due to execution of an application included in the interruption list, the state information client 185 changes a notification mode to a silent mode. Thereafter, when the operation of the first digital apparatus 100 corresponding to the interruption situation is completed, the state information client 185 converts the state of the first digital apparatus 100 into a state prior to the occurrence of the state conversion event, in step 1011.

When it is determined, in step 1011, that a manual conversion event has occurred according to a user's manipulation, the state information client 185 proceeds to step 1015. In step 1015, the state information client 185 determines whether the state information of the first digital apparatus 100 prior to the occurrence of the manual conversion event in step 1011 is being compulsorily automatically converted by a compulsorily automatic conversion event. When it is determined that the state information has been compulsorily automatically converted, the state information client 185 proceeds to step 1027 to neglect the manual conversion event having occurred in step 1011.

When it is determined in step 1015 that the state information has not been compulsorily automatically converted, the state information client 185 proceeds to step 1017 to process the manual conversion event. The manual conversion event is processed as shown in FIG. 9 or 10, according to reason for initiation. Alternatively, when the manual conversion event has occurred by a user's input through a state conversion menu for changing the state information, the state of the apparatus 100 is converted into a user selected state.

Alternatively, when an application included in a selection list is executed in the first digital apparatus 100, the state information client 185 determines that a selectively semiautomatic conversion event has occurred in step 1011, and proceeds to step 1019.

In step 1019, the state information client 185 determines whether the state information of the first digital apparatus 100, prior to the occurrence of the selectively semiautomatic conversion event in step 1011, is being compulsorily automatically converted by the compulsorily automatic conversion event. When it is determined that the state information has been compulsorily automatically converted, the state information client 185 proceeds to step 1027 to neglect the selectively semiautomatic conversion event having occurred in step 1011.

When it is determined in step 1019 that the state information has not been compulsorily automatically converted, the state information client 185 proceeds to step 1021 to process the selectively semiautomatic conversion event. For example, when the state information has corresponded to the normal state prior to the occurrence of the selectively semiautomatic conversion event, and the state information designated in correspondence to the application executed in step 1011 corresponds to a busy state, the state information client 185 sets the busy state, and transmits an update message, which requests that the state information should be updated to the busy state, to the state information server 200. Thereafter, when the application is completely executed, the state information client 185 converts the state of the first digital apparatus 100 into the state prior to the occurrence of the state conversion event in step 1011, and transmits the update message.

Meanwhile, the state information client 185 analyzes a current use manner and situation for the first digital apparatus 100 in conjunction with the controller 110, and when it is determined that the current situation has corresponded to a conversion situation included in a conversion list, determines that a situation recognition automatic conversion event has occurred in step 1011, and proceeds to step 1023.

For example, the conversion situation may be user absence, vehicle driving, sleeping, a specific schedule, a specific location of the first digital apparatus 100, or a specific category of application. The first digital apparatus 100 determines whether or not the current situation corresponds to the conversion situation through monitoring operations or output values of configuration modules included in the apparatus 100, a schedule and a morning alarm registered in the apparatus 100, and an operation of the apparatus 100.

For example, when there is no input of a user for a predetermined period of time, an output value of a proximity sensor of the sensor module 170 represents that there is no access of an object for a predetermined period of time, and an output value of an acceleration sensor represents that there is no movement of the apparatus 100 for a predetermined period of time, the controller 110 determines that the current situation has corresponded to the user absence, and notifies the state information client 185 of that.

In another embodiment of the present invention, when it is determined that the apparatus 100 has been connected to a vehicle through the near field communication module 132 or the connector 165, the controller 110 determines that the current situation has corresponded to vehicle driving, and notifies the state information client 185 of that.

Alternatively, the controller 110 may determine sleeping or a conference time through monitoring a user's schedule registered in advance in the apparatus 100, and may also determine that the current situation corresponds to the conversion situation.

In another embodiment of the present invention, when a location value of the GPS module 155 represents that a current location of the apparatus 100 corresponds to a specific location, such as a theater or a performing place, and there is a record to purchase a ticket for current time by using the apparatus 100, the controller 110 may determine that the current situation corresponds to performance (or movie) watching, and may notify the state information client 185 of that determined fact.

Otherwise, when a specific category of application, for example, an application corresponding to a game category, or an application corresponding to a multimedia file playback, is executed, the controller 110 may also determine that the current situation corresponds to a conversion situation.

Referring back to FIG. 11, in step 1023, the state information client 185 determines whether the state information of the first digital apparatus 100, prior to the occurrence of the situation recognition automatic conversion event in step 1011, is in the compulsorily automatic conversion by the compulsorily automatic conversion event, or is in the selectively semiautomatic conversion by the selectively semiautomatic conversion event. When it is determined that the state information of the first digital apparatus 100 has been compulsorily automatically converted, or is selectively semiautomatically converted, the state information client 185 proceeds to step 1027 to neglect the situation recognition automatic conversion event having occurred in step 1011.

When it is determined in step 1023 that the state information of the first digital apparatus 100 has not been in the compulsorily automatically converted, or is not selectively semiautomatically converted, the state information client 185 proceeds to step 1025 to process the situation recognition automatic conversion event. For example, when the state information has corresponded to the normal state prior to the occurrence of the situation recognition automatic conversion event, and the state information designated in correspondence to the conversion situation having been determined in step 1011 corresponds to a busy state, the state information client 185 sets the busy state, and transmits an update message, which requests that the state information should be updated to the busy state, to the state information server 200. Moreover, if the state information is not changed due to execution of an application, the state information client 185 changes a notification mode to a vibration mode. Thereafter, when an operation of the first digital apparatus 100 corresponding to the conversion situation is completed, the state information client 185 converts the state of the first digital apparatus 100 into the state prior to the occurrence of the state conversion event in step 1011, and also converts the notification mode.

As described above, the first digital apparatus 100 processes the state conversion event.

Moreover, although the controller 110 of the first digital apparatus 100 and the state information client 185 have been described differently in FIGS. 9 to 11, all functions of the state information client 185 may also be performed in the controller 110, as illustrated in FIG. 4.

A contact list displayed in a first digital apparatus 100, according to an embodiment of the present invention, is described with reference to FIG. 13. The contact list, according to an embodiment of the present invention, is formed of user items corresponding to one or more users included in the contact list. Identification information such as, for example, a name of the corresponding user, one or more phone numbers, state information of the corresponding user, and a service user ID of the corresponding user, are stored in each user item constituting the contact list, according to the embodiment of the present invention. Moreover, an additional address, for example, an e-mail address, an IM service ID, and an SNS ID, in addition to the phone number of the corresponding user, may be stored in the user item. Moreover, a list of one or more communication services through which communication can be made by using the stored communication address (including the phone number) is stored in the user item.

Figure 13:
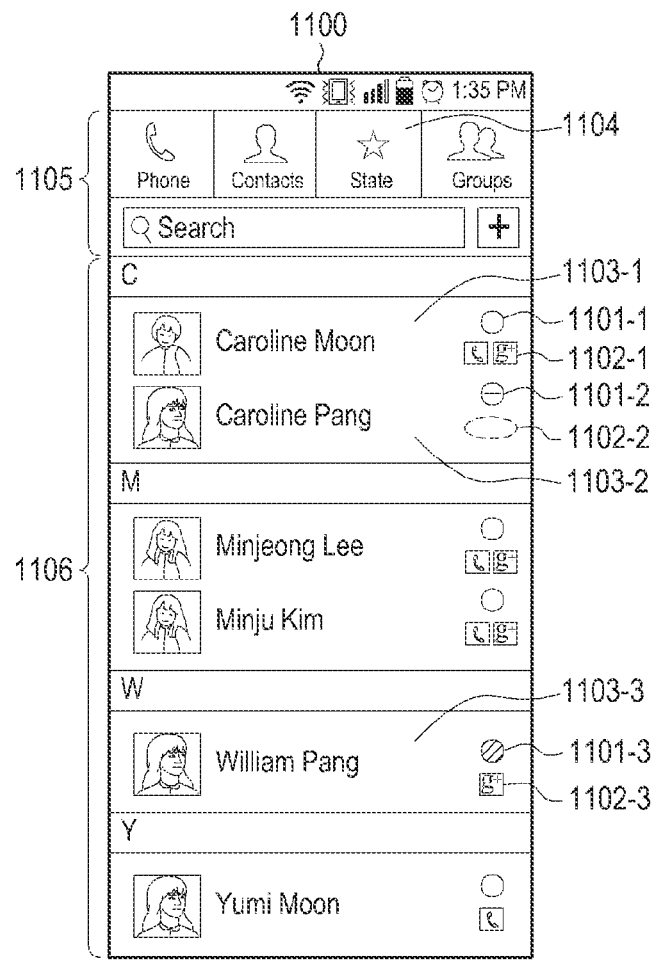
FIGS. 13 and 14 illustrating a contact list and state information display, according to an embodiment of the present invention.

When receiving a request for displaying the contact list from a user, the controller 110 controls such that a basic screen 1100 is displayed on the touch screen 190, as shown in FIG. 13. Referring to FIG. 13, the basic screen 1100 is formed of a menu area 1105 where function menus related to the contact list are displayed, and a user item area 1106 where contents related to the user items constituting the contact list are displayed.

The menu area 1105 includes a state conversion menu icon 1104 corresponding to a state conversion menu for changing a state of the first digital apparatus 100.

The user item area 1106 includes an area in which an image corresponding to the user, a user name corresponding to the user, a state indicator representing state information corresponding to the user, and a category indicator representing a category of a communication service recommended according to the state information, are displayed according to the user items included in the contact list. For example, the category indicator may be divided into a phone call indicator representing a telephone call based communication service, and a text indicator representing a text based communication service. Accordingly, when the corresponding user is in a normal state, a normal state indicator, the phone call indicator, and the text indicator are displayed. When the corresponding user is in a busy state, a busy state indicator and the text indicator are displayed. When the corresponding user is in a no disturbance state, the category indicator is not displayed, or the fact that the category indicator is deactivated is displayed.

The phone call indicator and the text indicator may be independent indicators for providing only category information of the communication service, according to an embodiment of the present invention. Alternatively, any one of indicators corresponding to all sorts of telephone call based communication services, such as a voice call indicator and a video call indicator, may be used as a phone call indicator. Any one of indicators corresponding to text based communication services, such as an IM service indicator, an SNS service indicator, and an e-mail service indicator, may be used as a text indicator. When the indicators corresponding to all sorts of telephone call based communication services and the indicators corresponding to all sorts of text based communication services are used as a category indicator, and user input for selecting the category indicator included in the user item area 1106 is input, the digital apparatus 100 may operate to provide the corresponding communication service.

An indicator corresponding to at least one communication service recommended according to the state information may be directly displayed in the user item area 1106, according to another embodiment of the present invention. Specifically, in a normal state, different types of indicators corresponding to communication services recommended in the normal state may be displayed as a category indicator, and in a busy state, different types of indicators corresponding to communication services recommended in the busy state may be displayed as a category indicator. When different types of indicators corresponding to the recommended communication services are displayed, and a user selects a specific communication service indicator, the digital apparatus 100 may operate to provide the corresponding communication service.

In an embodiment of the present invention illustrated in FIG. 13, a user name "Caroline Moon", a normal state indicator for representing a normal state 1101-1, and a phone call indicator and a text indicator 1102-1 are displayed in a first user item 1103-1 of the basic screen 1100. Moreover, a user name "Caroline Pang", and a no disturbance state indicator 1101-2 representing a no disturbance state are displayed in a second user item 1103-2, and an area where a category indicator would be displayed corresponds to a blank 1102-2. A user name "William Pang", a busy state indicator representing a busy state 1101-3, and a text indicator 1102-3 are displayed in a third user item 1103-3.

The user of the first digital apparatus 100 may determine the state information according to the users and the category of the available communication service through the basic screen 1100 of the contact list. When selecting the user item on the basic screen 1100, the user may determine a communication service through which communication can be made in regard to the corresponding user.

Figure 14:
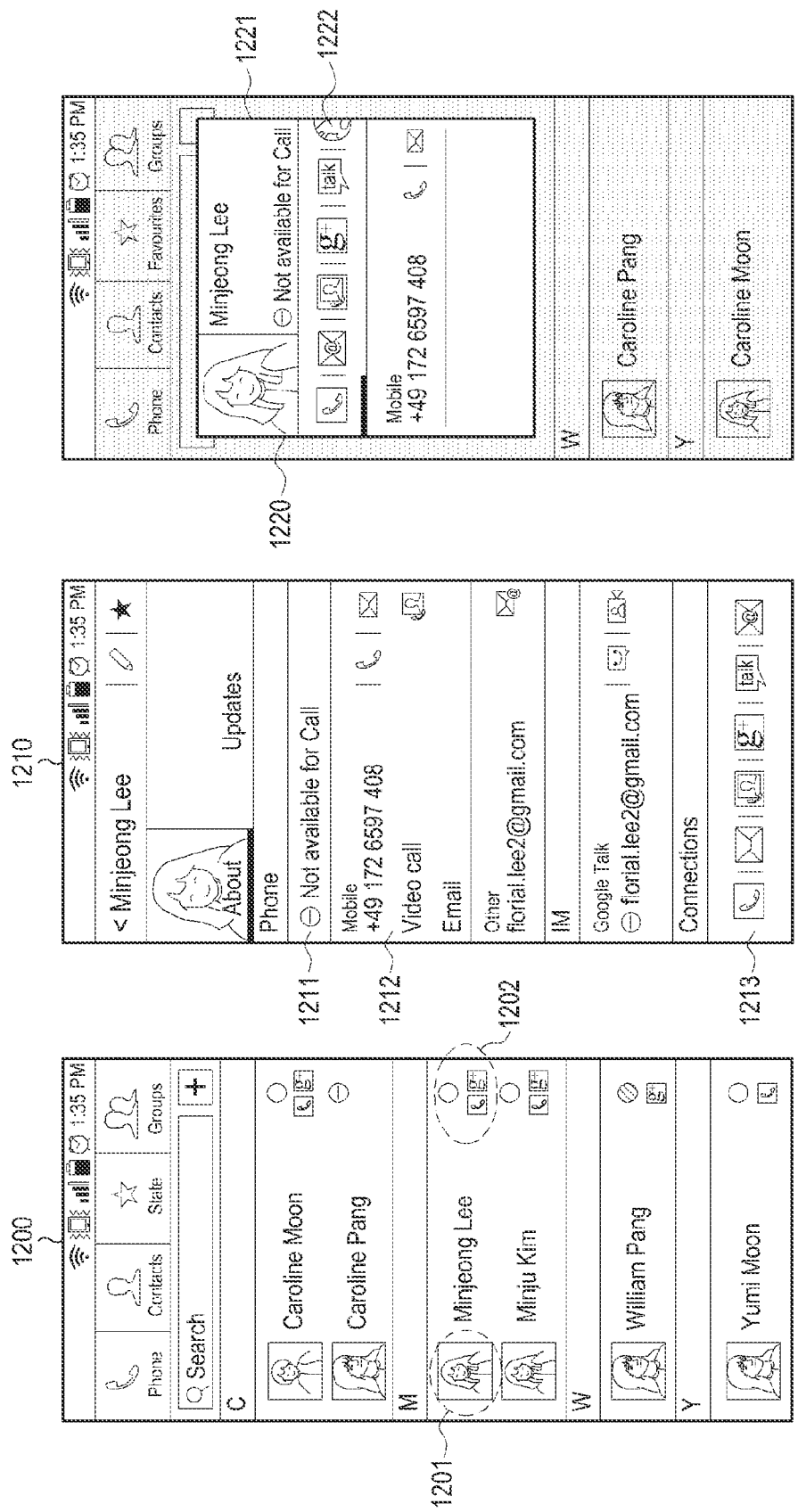

Referring to FIG. 14, when an image area 1201 of user "Minjeong Lee" is selected in a state where a basic screen 1200 is displayed, a detailed information screen 1210 for providing detail information stored in a user item corresponding to user "Minjeong Lee" is displayed. State information of the user, communication addresses stored corresponding to the user, a communication service indicator using each communication address, and a communication service indicator recommended according to the state information, are displayed on the detailed information screen 1210.

In the embodiment of the present invention illustrated in FIG. 14, the detailed information screen 1210 includes a state information area 1211, a communication information area 1212, and a communication service guide area 1213.

State information of the corresponding user is displayed in the state information area 1211, and state information for representing a normal state is displayed in the state information area 1211, as illustrated in FIG. 14.

Communication addresses stored corresponding to the user, and communication service indicators using the communication address are displayed in the communication information area 1212. A mobile phone number, a voice call indicator for representing a communication service using the phone number, a text message service indicator, and a video call indicator are displayed at the communication information area 1212, as illustrated in FIG. 14. Moreover, an e-mail address and an e-mail indicator for representing a communication service using the e-mail address are displayed at the communication information area 1212. An IM service ID and an IM service indicator are displayed in the communication information area 1212.

A communication service indicator for representing a communication service recommended according to a state of the corresponding user, from among communication services using at least one communication address registered in correspondence to the corresponding user, is displayed at the communication service guide area 1213. In the embodiment of the present invention illustrated in FIG. 14, since user "Minjeong Lee" is in a normal state, the communication service indicator corresponding to all communication services using the mobile phone number, the e-mail address, and the IM service ID is displayed at the communication service guide area 1213.

Accordingly, a user of a first digital apparatus 100 may determine a communication service to use through reference of a communication service indicator displayed at the communication service guide area 1213. Moreover, when the user of the first digital apparatus 100 selects the communication service indicator displayed at the communication service guide area 1213, the first digital apparatus 100 provides a communication service corresponding to the selected communication service indicator.

When the area 1202, where state information of user "Minjeong Lee" is displayed, is selected on the basic screen 1200, the basic screen 1200 is overlaid with a brief information window 1220. The brief information window 1220 includes state information 1221 of the corresponding user, and communication service indicators 1222 for representing communication services recommended according to the state of the corresponding user. When a specific communication service indicator is selected among the communication service indicators included in the brief information window 1220, the first digital apparatus 100 provides a communication service corresponding to the selected communication service indicator.

Figure 15:
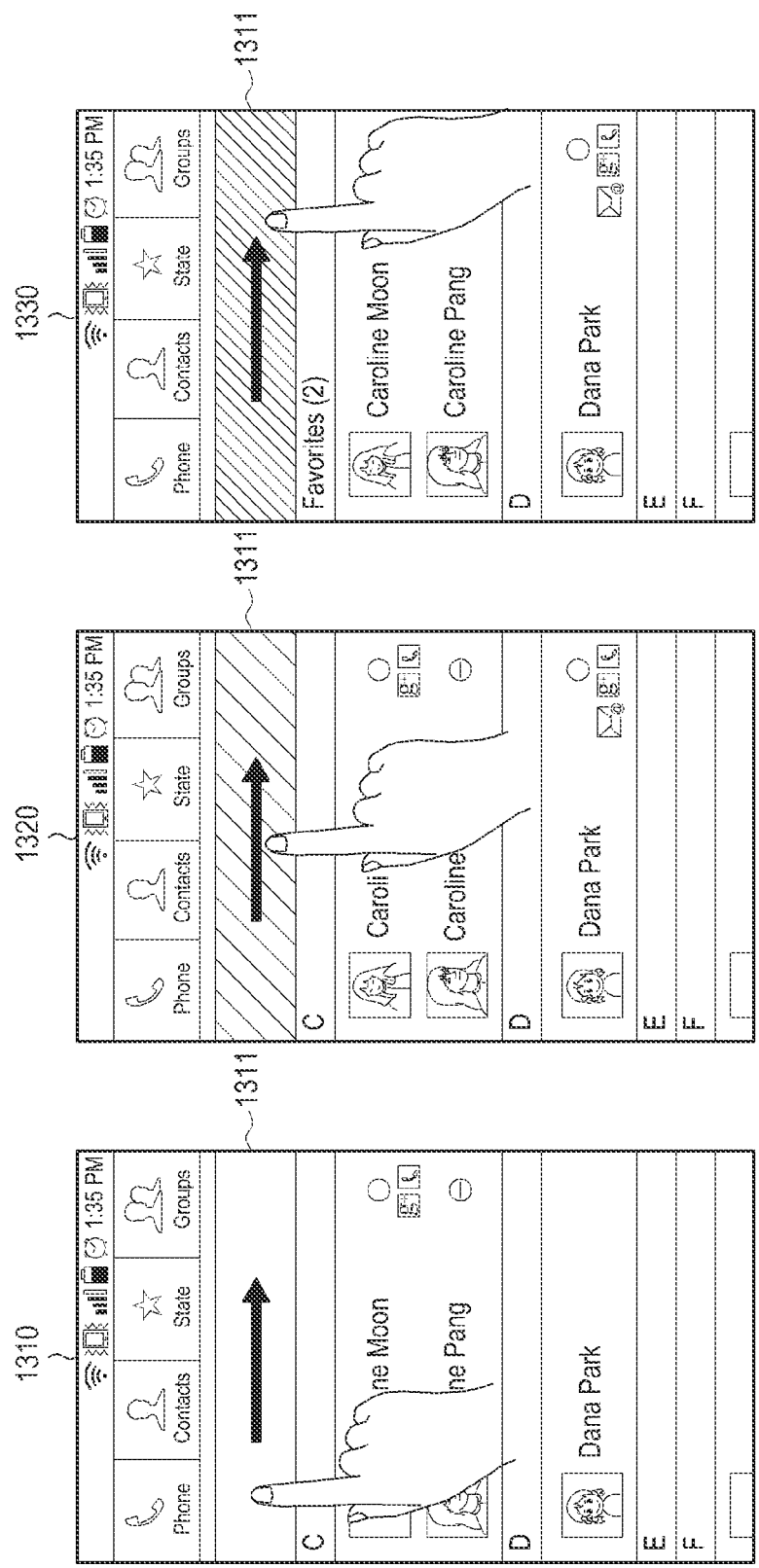
FIGS. 15 and 16 illustrating user interfaces for changing a user state in a digital apparatus, according to embodiments of the present invention.
Figure 16:
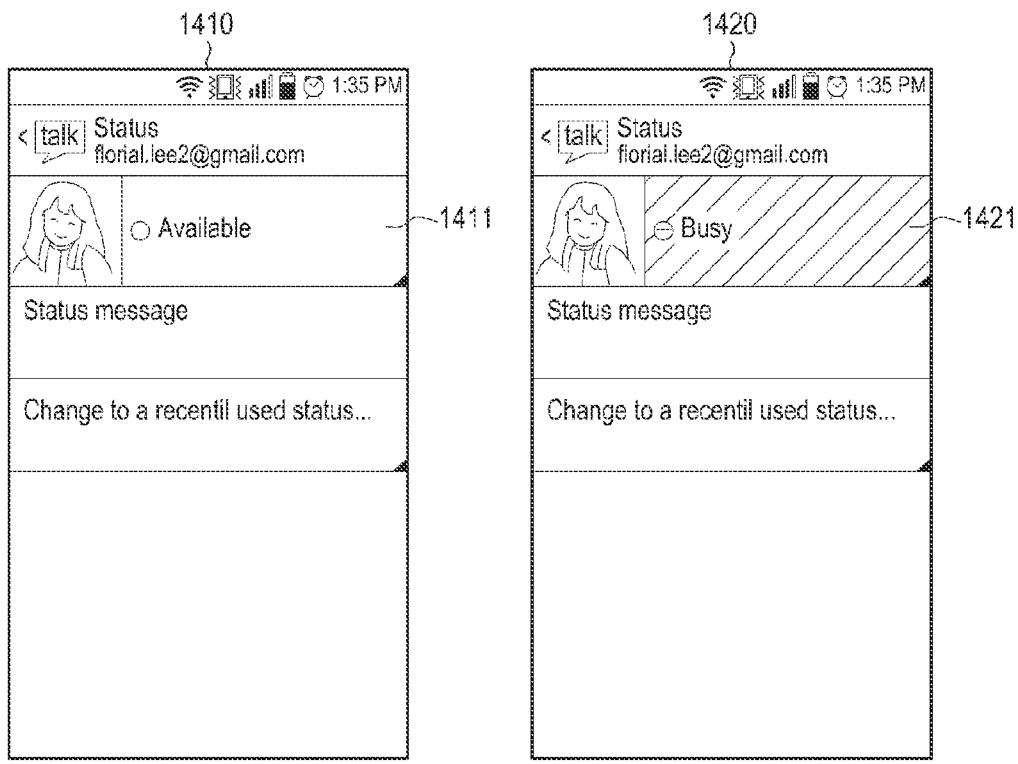

FIGS. 15 and 16 illustrate user interfaces for manually changing state information of the first digital apparatus 100. FIG. 15 shows an example of a process of changing state information by using a state conversion menu, according to an embodiment of the present invention. FIG. 16 shows an example of a process of changing IM state information in an IM service, according to an embodiment of the present invention.

When a user of the first digital apparatus 100 selects the state conversion menu icon 1104 on the basic screen 1100 of FIG. 13, a state information conversion area 1311 is displayed in a first screen 1310 of FIG. 15. A color corresponding to current state information of the first digital apparatus 100, or text for representing the state information may be displayed at the state information conversion area 1311. For example, a green color is displayed when the state of the first digital apparatus 100 corresponds to a normal state, a yellow color is displayed when the state of the first digital apparatus 100 corresponds to a busy state, and a red color is displayed when the state of the first digital apparatus 100 corresponds to a no disturbance state.

The user of the first digital apparatus 100 touches the state information conversion area 1311 in a predetermined pattern to change the state of the first digital apparatus 100. In an embodiment of the present invention, it is assumed that a state information conversion pattern corresponds to a horizontal touch (for example, a flick gesture or a drag gesture) for the state information conversion area 1311. In the embodiment of the present invention illustrated in FIG. 15, it is assumed that the current state of the first digital apparatus 100 has corresponded to the normal state. Accordingly, a color representing the normal state is displayed at the state information conversion area 1311 on the first screen 1310. As the user horizontally touches the state information conversion area 1311, the state of the first digital apparatus 100 is changed to the busy state on a second screen 1320, and is changed to the no disturbance state on a third screen 1330. In this way, according to an embodiment of the present invention, the first digital apparatus 100 may change the states differentiated through the state information in response to a user input for the state information conversion area 1311. Moreover, the states may be displayed for the same user input (for example, a horizontal touch) while circulating according to a direction of a touch gesture. For example, when a touch gesture of the same direction is received at the state information conversion area 1311 on the third screen 1330, the color for representing the normal state is displayed anew on the first screen 1310, and the first digital apparatus 100 may be changed to the normal state.

According to an embodiment of the present invention, when the user changes the state of the first digital apparatus 100 through the state information conversion menu, a notification mode and IM state information are changed to a notification mode and IM state information corresponding to the state information as well.

FIG. 16 shows an example of a user interface provided when IM state information is changed in an IM service. Screens 1410 and 1420 correspond to screens provided when a menu for changing IM state information is selected in the IM service, and represent an example in which an IM state information screen 1410 of a normal state is changed to an IM state information screen 1420 of a busy state. For example, IM state information screen 1410 of a normal state may include IM state information representing Available 1411 and menu corresponding Change to a recently used state 1431. IM state information screen 1420 of a busy state may include IM state information representing Busy 1421.

As the IM state information is changed in the IM service, the state of the first digital apparatus 100 may also be converted into the corresponding state, and the notification mode may also be converted into the corresponding mode.

Figure 12:
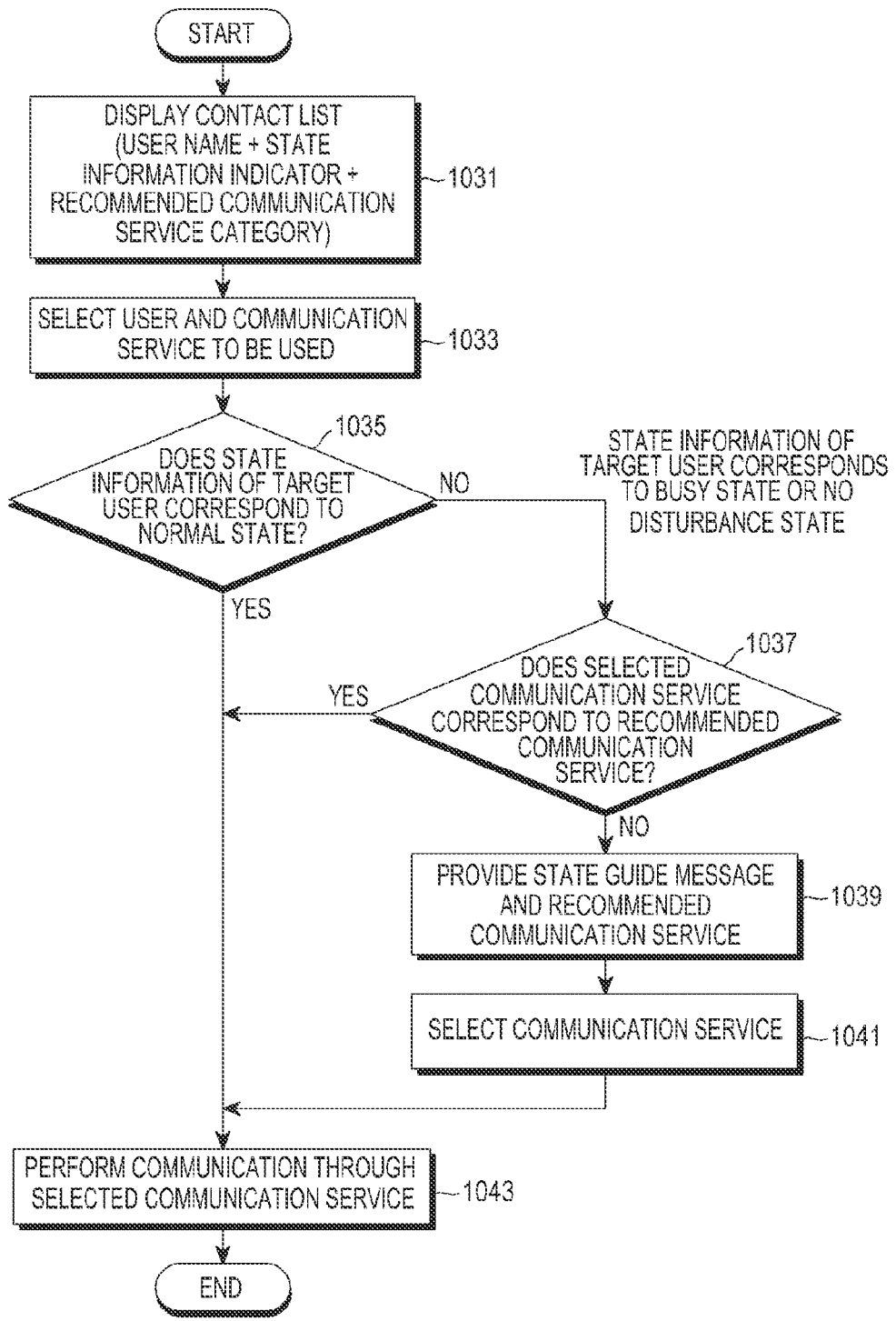
FIG. 12 is a flowchart illustrating a communication performing process of a digital apparatus, according to an embodiment of the present invention.
Figure 17:
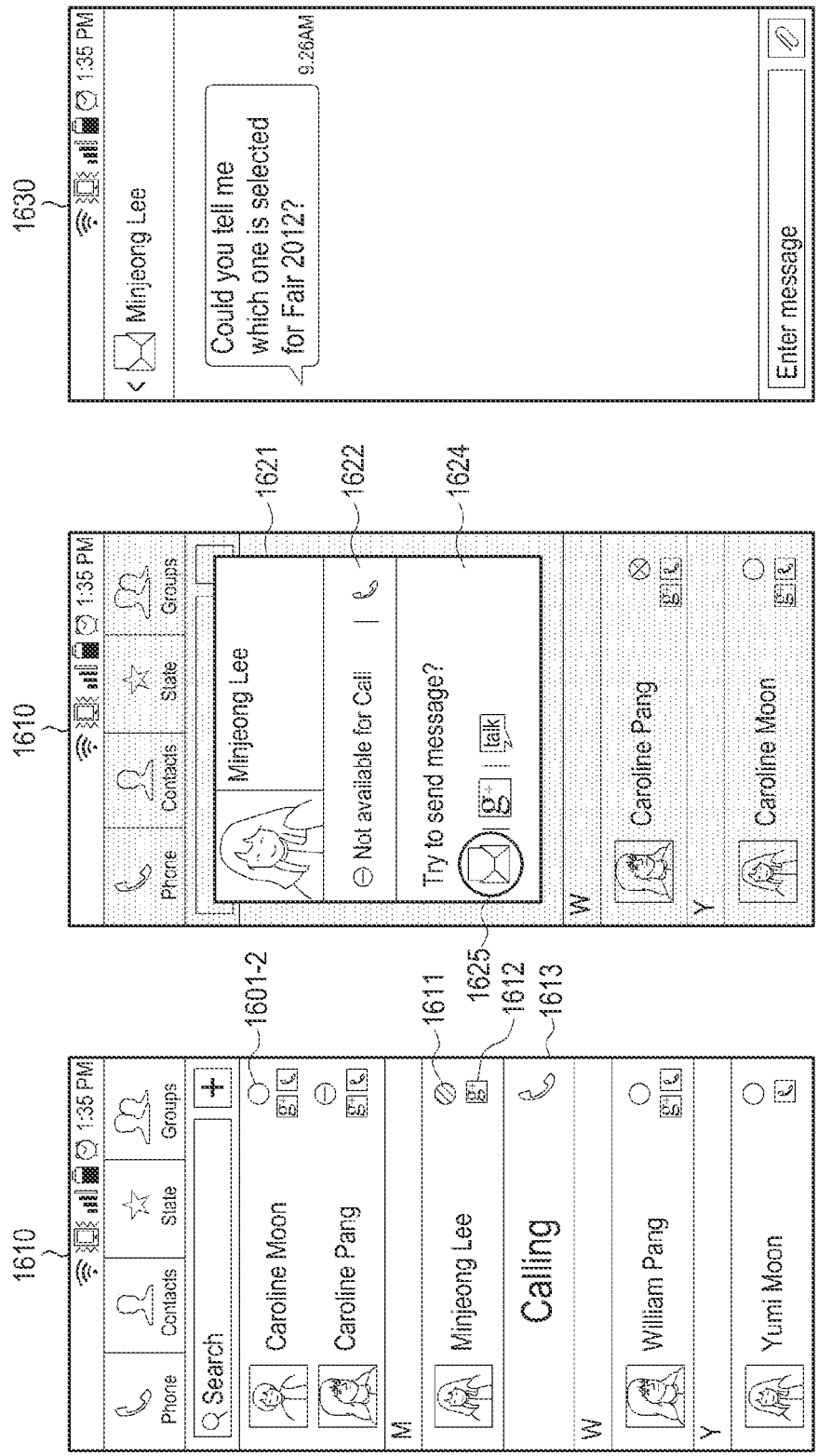
FIG. 17 is a diagram illustrating a user interface according to communication performance of a digital apparatus, according to an embodiment of the present invention.

A process in which a first digital apparatus 100 performs communication while displaying a contact list will be described with reference to FIGS. 12 and 17. FIG. 12 is a flowchart illustrating an operation process of a first digital apparatus 100, according to an embodiment of the present invention. FIG. 17 shows a screen display of a sending process, according to an embodiment of the present invention.

Referring to FIG. 12, when a request for displaying a contact list is input from a user, a controller 110 of the first digital apparatus 100 controls such that the contact list is displayed, in step 1031. For example, a contact list on a basic screen 1610 of FIG. 17 may be displayed on the touch screen 190.

A user may select a counterpart user to make a communication, that is, a target user in the basic screen 1610. In the embodiment of the present invention illustrated in FIG. 17, it is assumed that the target user corresponds to "Minjeong Lee", and a request for connecting a voice call has been input. Moreover, it is assumed that an input of the request for connecting the voice call for target user "Minjeong Lee" is performed through touching an area where a name referred to as "Minjeong Lee" is displayed on the basic screen 1610.

A busy state indicator 1611 and a text indicator 1612 are displayed in a user item 1613 corresponding to user "Minjeong Lee" on the basic screen 1610 of FIG. 17. Specifically, it is represented that user "Minjeong Lee" is in the busy state, and user "Minjeong Lee" prefers a text based communication service.

Referring back to FIG. 12, after displaying the contact list, the controller 110 determines, in step 1033, that a target user and a communication service to be used have been selected through a user's manipulation. For example, in the embodiment of FIG. 17, a user touches the area where "Minjeong Lee" is displayed, among the user items 1613, to input a request for sending a voice call to target user "Minjeong Lee". The touch for the user item may be input as a request for sending the voice call according to whether or not a touch gesture recognized in the first digital apparatus 100 corresponds to a predetermined touch gesture. For example, when a touch (for example, a flick gesture or a drag gesture) of moving from left to right is recognized for the user item, the first digital apparatus 100 may operate based on a determination that the request for sending the voice call has been received. Moreover, when a touch (for example, a flick gesture or a drag gesture) of moving from right to left is recognized for the user item, the first digital apparatus 100 may operate based on a determination that a request for a text message type of communication has been received. Moreover, it should be understood that instead of determining, through the touch gesture, that the specific communication service has been selected as shown in FIG. 17, the first digital apparatus 100 may also identically operate through designation of the target user item discovered in the contact list or an icon for requesting a specific communication service for the corresponding user. In this way, the screen 1610 shown on a left side of FIG. 17 represents that the request for sending the voice call for the target user is received.

The controller 110 determines, in step 1035, whether state information of the selected user, that is, the target user, corresponds to the normal state. When it is determined that the target user corresponds to the normal state, communication is performed through the selected communication service, in step 1043. Specifically, in FIG. 17, when the state information of target user "Minjeong Lee" corresponds to the normal state, the controller 110 performs an operation to make a voice call with the target user "Minjeong Lee"

When it is determined in step 1035 that the state information of the target user does not correspond to the normal state, but instead to a busy state or a no disturbance state, the controller 110 proceeds to step 1037. In step 1037, the controller 110 determines, according to the state information of the target user, whether the selected communication service corresponds to a preferred communication service, that is, a recommended communication service. For example, when the state information of the target user corresponds to the busy state, a text based communication service is a recommended communication service, but a telephone call based communication service is a non-recommended communication service. When the state information of the target user corresponds to the no disturbance state, both the text based communication service and the telephone call based communication service are non-recommended communication services.

When it is determined in step 1037 that the selected communication service corresponds to the recommended communication service, the controller 110 proceeds to step 1043 to control such that communication is made through the selected communication service. For example, when the state information of the target user corresponds to the busy state, and the selected communication service having been determined in step 1033 corresponds to a text message service, the controller 110 controls such that a user interface for performing the text message service is provided.

However, when it is determined in step 1037 that the communication service does not correspond to the recommended communication service, the controller 110 proceeds to step 1039 to provide a state guide message and a recommended communication service list to the user. The state guide message includes a message for informing that the selected communication service is not available according to the state of the target user, and the communication service indicator having been selected in step 1033. The recommended communication service list displays a communication service indicator, which is available according to the state of the corresponding user, among communication services using one or more communication addresses having been registered in correspondence to the user.

Since a connection for a voice call with target user "Minjeong Lee" in the busy state is requested in the embodiment of FIG. 17, the controller 110 controls such that a state guide window 1621 is displayed while overlaying the basic screen 1610. The state guide window 1621 includes a message 1623 for informing that the connection for the voice call with target user "Minjeong Lee" is not available, and a voice call indicator 1622. As target user "Minjeong Lee" is in the busy state, a recommended communication service list including a text based communication service, that is, a text message service indicator 1624 capable of connecting with target user "Minjeong Lee", and an IM service indicator 1625 are displayed in the state guide window 1621.

Accordingly, the user may neglect the state information of the target user to request a communication connection with a desired communication service, and may select any one of the recommended communication services to request a communication connection. For example, even though target user "Minjeong Lee" is in the busy state in the state guide window 1621, the user may touch the voice call indicator to continuously request the connection for the voice call. Alternatively, the user may also select any one of the communication service indicators 1625 and 1626 of the recommended communication service list 1624.

Referring back to FIG. 12, when communication service selection by the user is determined in step 1041, the controller 110 proceeds to step 1043 to control such that communication is performed through the selected communication service. In other words, when the user selects any one of the communication services included in the recommended communication service list provided in step 1039, the controller 110 controls such that an operation according to the selected communication service is performed. Alternatively, when the user continuously selects the communication service having been selected in step 1033, the controller 110 controls such that an operation according to the corresponding communication service is performed.

FIG. 17 illustrates an example in which the user selects the communication service indicator included in the recommended communication service list 1624. Specifically, the user selects the text message service indicator 1625 in the recommended communication service list 1624 of the state guide window 1621. Accordingly, the controller 110 controls such that a user interface 1630 for the text message service is provided, and the user gets in touch with target user "Minjeong Lee" through the text message service.

Although FIG. 17 has shown the example in which the user selects the communication service indicator included in the recommended communication service list 1624, the user may also attempt to make a voice call with target user "Minjeong Lee" through selection of the voice call indicator 1622 in the state guide window 1621.

Although FIGS. 12 and 17 have shown the example in which the user attempts to make communication with the target user through the specific communication service in the state where the basic screen of the contact list is displayed, even when the user attempts the communication through the specific communication service in the state where the detail information screen 1210 or the brief information window 1220 of the contact list having been shown in FIG. 14 are displayed, the controller 1100 may similarly operate.

For example, when the user selects the communication service indicator displayed at communication service guide area 1213 in a state where the detail information screen 120 is displayed, the first digital apparatus 100 provides a communication service corresponding to the selected communication service indicator. When the user selects the communication service indicator displayed in the communication information area 1212, the controller 110 determines, according to the state information of the target user, whether or not the selected communication service corresponds to an allowed communication service. When it is determined that the communication service has not corresponded to the recommended communication service, the controller 110 may provide the state guide message and the recommended communication service list to the user through the state guide window.

As described above with reference to FIGS. 12 and 17, since the expression such as 'whether to allow a communication service' or 'whether to perform a communication service' represents a use intention for the corresponding communication service from a point of view of the user in the digital apparatus, the expression may represent advice or recommendation as to determine whether to use the corresponding communication service. Accordingly, it should be understood that the expression such as 'whether to allow a communication service' or 'whether to perform a communication service' may not represent an inoperable state or a malfunction state of the communication service itself. For example, since the message 1623, shown in FIG. 17, for informing that the voice call connection is not available for target user "Minjeong Lee" does not recommend the voice call connection, the message 1623 may recommend another communication service. Moreover, the user may select the voice call indicator 1622 to attempt the voice call without following the recommendation. Moreover, according to another embodiment of the present invention, the state information may also include 'whether or not to perform or activate the communication service provided in the digital apparatus' as well as the user state information on the user's use intention of the communication service.

Figure 18:
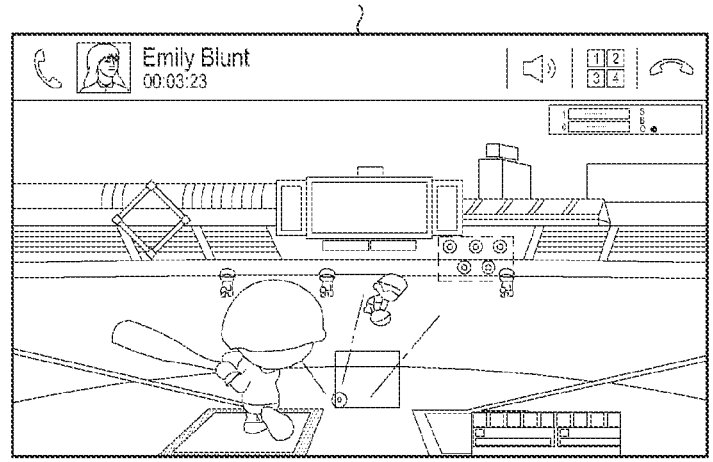
FIGS. 18 and 19 illustrate a phone call reception notification of a digital apparatus, according to an embodiment of the present invention.
Figure 19:
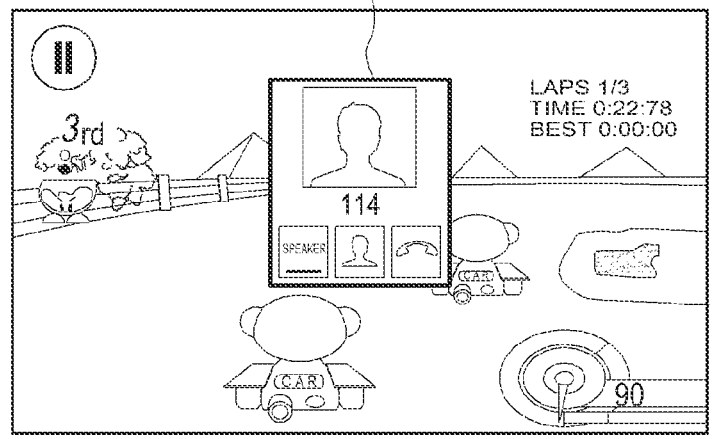

Processes of processing a call reception or a message reception according to state information of a first digital apparatus 100 will be described hereinafter with reference to FIGS. 18 and 19.

When different types of phone calls or messages are received, or a push message internally occurs in the first digital apparatus 100 in a state where a no disturbance state is set in the first digital apparatus 100, according to an occurrence of a compulsorily automatic conversion event, a mini popup window or a call bar for informing of that is displayed. The mini popup window or the call bar may be realized through a translucent display layer. FIG. 18 shows an example in which a call bar 1700 is displayed, and FIG. 19 shows an example in which a mini popup window 1710 is displayed.

At a time when different types of phone calls or messages have been received, or the push message has internally occurred in the first digital apparatus 100, even in the case in which different types of phone calls or messages are received, or a push message internally occurs in the first digital apparatus 100 while application A included in any one of an interruption list, a selection list, and a conversion list is executed, a mini popup window 1710 or a call bar 1700 for informing of that is displayed. When the mini popup window 1710 or the call bar 1700 is displayed, application A is continuously executed.

Thereafter, when a response action for the mini popup window 1710 or the call bar 1700 is input from a user, application A is temporarily stopped, and processing of the received phone calls, the received messages, or the push message is performed. When a rejection action is input from the user for the mini popup window 1710 or the call bar 1700, or no user action is input for a predetermined period of time, the received phone calls, the received messages, or the push message is neglected.

Moreover, when the user state information of the first digital apparatus 100 corresponds to the busy state or the no disturbance state, a notification tone, a vibration, or a call reception information display in an upper-positioned layer of a screen may be controlled to be omitted or not to operate for the call reception in response to the voice call request, and this may be set or changed according to a user's designation.

As described above, embodiments of the present invention provide a method and an apparatus for sharing state information that can be applied to a telephone communication based communication service. Moreover, embodiments of the present invention provide a method and an apparatus for sharing state information in which a telephone communication service and an IM service are interlocked with each other. Furthermore, embodiments of the present invention may provide a method and an apparatus in which a conversion of a notification tone and a conversion of state information of a digital apparatus are connected with each other so that the state information may be more easily set.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of providing state information of a digital apparatus, the method comprising the steps of:
   receiving a display request for a contact list;
   displaying a screen having a plurality of user information, each of the plurality of user information corresponding to a respective one of a plurality of users in the contact list;
   receiving input selecting a user, from among the plurality of users, and a communication service to be used; and
   providing at least one of a non-recommendation message about the selected communication service or one or more recommended communication services corresponding to the at least one recommended communication service category of the user,
   wherein when the selected communication service is not of the at least one recommended communication service category for the user, providing a recommended communication service list including the non-recommendation message.

2. The method of claim 1, further comprising:
   receiving input selecting one of the one or more recommended communication services in the recommended communication service list; and
   providing the selected recommended communication service.

3. The method of claim 1, further comprising:
   when an input reselecting the selected communication service is received, providing the selected communication service.

4. The method of claim 1, when the user selects a displayed category indicator, a communication service corresponding to the displayed category indicator is provided.

5. The method of claim 1, wherein the state information of the digital apparatus comprises:
   a normal state in which both a telephone call based communication service and a text based communication service are preferred;
   a busy state in which only the text based communication service is preferred; and
   a no disturbance state in which neither the telephone call based communication service nor the text based communication service is preferred.

6. The method of claim 5, wherein a notification tone mode of the digital apparatus comprises:
   a ring tone mode that corresponds to the normal state;
   a vibration mode the corresponds to the busy state; and
   a silent mode that corresponds to the no disturbance state,
   wherein, when the notification tone mode of the digital apparatus is changed, the state information of the digital apparatus is changed to state information corresponding to the changed notification tone mode, and
   when the state information of the digital apparatus is changed, the notification tone mode of the digital apparatus is changed to a notification tone mode corresponding to the changed state information.

7. The method of claim 5, wherein, when the state information of the digital apparatus is changed, Instant Messaging (IM) state information of the digital apparatus is changed to IM state information corresponding to the changed state information.

8. The method of claim 5, wherein, when a state conversion event requiring a state modification of the digital apparatus occurs, the state information of the digital apparatus is changed, and
   wherein the state conversion event comprises at least one of a compulsorily automatic conversion event, a manual conversion event, a selectively semiautomatic conversion event, and a situation recognition automatic conversion event.

9. The method of claim 8, wherein the compulsorily automatic conversion event occurs when the digital apparatus is in an interruption situation that is included in an interruption list, and the digital apparatus is changed to the no disturbance state when the compulsorily automatic conversion event occurs.

10. The method of claim 8, wherein the selectively semiautomatic conversion event occurs when an application included in a selection list is executed in the digital apparatus, and the state information of the digital apparatus is changed to state information corresponding to the executed application.

11. The method of claim 8, wherein the situation recognition automatic conversion event occurs when it is determined, through an analysis of a current use manner and a current situation of the digital apparatus, that the current situation corresponds to a conversion state included in a conversion list, and the state information of the digital apparatus is changed to state information corresponding to the conversion state.

12. The method of claim 1, wherein the state information of the digital apparatus is transmitted to a server each time the state information changes.

13. The method of claim 1,
wherein at least one of the plurality of user information comprises:
information for identification of a user corresponding to the at least one of the plurality of user information and a state of the corresponding user that is received from a server, and
at least one category indicator representing at least one recommended communication service category determined based on the information of the corresponding user.

14. A digital apparatus for providing state information, the digital apparatus comprising:
a display panel configured to display data under the control of a controller; and
the controller configured to display a screen having a plurality of user information, each of a plurality of user information corresponding to a respective one of a plurality of users in the contact list on the display panel, receive input selecting a user from among the plurality of users and a communication service to be used, and provide at least one of a non-recommendation message or one or more recommended communication services corresponding to the at least one recommended communication service category of the user,
wherein the controller, when the selected communication service is not of the at least one recommended communication service category of the user, provides a recommended communication service list including the non-recommendation message.

15. The digital apparatus of claim 14, wherein the controller receives input selecting one of the one or more recommended communication services in the recommended communication service list, and provides the selected recommended communication service.

16. The digital apparatus of claim 14, wherein, when an input reselecting the selected communication service is received, the controller provides the selected communication service.

17. The digital apparatus of claim 14, when the user selects a displayed category indicator, the controller provides a communication service corresponding to the displayed category indicator.

18. The digital apparatus of claim 14, wherein the state information of the digital apparatus comprises:
a normal state in which both a telephone call based communication service and a text based communication service are preferred;
a busy state in which only the text based communication service is preferred; and
a no disturbance state in which neither the telephone call based communication service nor the text based communication service is preferred.

19. The digital apparatus of claim 18, wherein a notification tone mode of the digital apparatus comprises:
a ring tone mode that corresponds to the normal state;
a vibration mode that corresponds to the busy state; and
a silent mode that corresponds to the no disturbance state,
wherein, when the notification tone mode of the digital apparatus is changed, the state information of the digital apparatus is changed to state information corresponding to the changed notification tone mode, and
when the state information of the digital apparatus is changed, the notification tone mode of the digital apparatus is changed to a notification tone mode corresponding to the changed state information.

20. The digital apparatus of claim 18, wherein, when the state information of the digital apparatus is changed, Instant Messaging (IM) state information of the digital apparatus is changed to IM state information corresponding to the changed state information.

21. The digital apparatus of claim 18, wherein, when a state conversion event for requiring a state modification of the digital apparatus occurs, the state information of the digital apparatus is changed, and
wherein the state conversion event comprises at least one of a compulsorily automatic conversion event, a manual conversion event, a selectively semiautomatic conversion event, and a situation recognition automatic conversion event.

22. The digital apparatus of claim 21, wherein the compulsorily automatic conversion event occurs when the digital apparatus is in an interruption situation that is included in an interruption list and the digital apparatus is in the no disturbance state when the compulsorily automatic conversion event occurs.

23. The digital apparatus of claim 21, wherein the selectively automatic conversion event occurs when an application included in a selection list is executed in the digital apparatus, and the state information of the digital apparatus is changed to state information corresponding to the executed application.

24. The digital apparatus of claim 21, wherein the situation recognition automatic conversion event occurs when it is determined, through an analysis of a current use manner and a current situation of the digital apparatus, that the current situation corresponds to a conversion state included in a conversion list, and the state information of the digital apparatus is changed to state information corresponding to the conversion state.

25. The digital apparatus of claim 14, wherein the state information of the digital apparatus is transmitted to a server each time the state information changes.

26. The digital apparatus of claim 14,
wherein at least one of the plurality of user information comprises:
information for identification of a user corresponding to the at least one of the plurality of user information and state of the corresponding user that is received from a server, and
at least one category indicator representing at least one recommended communication service category determined based on the information of the corresponding user.

27. A method of providing state information of a digital apparatus, the method comprising:
receiving a display request for a contact list; and
displaying a screen having a plurality of user information corresponding to a respective one of a plurality of users in the contact list, wherein at least one of the plurality of user information comprises:
identification information of a user corresponding to the at least one of the plurality of user information,
state information of the corresponding user that is received from a server, and
at least one category indicator representing at least one recommended communication service category determined based on the state information of the corresponding user,
wherein, when a state conversion event requiring a state modification of the digital apparatus occurs, the state information of the digital apparatus is changed,
wherein a compulsorily automatic conversion event occurs when the digital apparatus is in an interruption situation, and the digital apparatus changes to a no disturbance state corresponding to the compulsorily automatic conversion event, and
wherein when a selected communication service is not of the at least one recommended communication service category for the user, providing a recommended communication service list including a non-recommendation message.

28. A non-transitory storage medium configured to store a program that, when executed by one or more processors, causes the one or more processors to:
receive a display request for a contact list;
display a screen having a plurality of user information, each of the plurality of user information corresponding to a respective one of a plurality of users in the contact list;
receive input selecting a user, from among the plurality of users, and a communication service to be used; and
provide at least one of a non-recommendation message about the selected communication service or one or more recommended communication services corresponding to the at least one recommended communication service category of the user,
wherein when the selected communication service is not of the at least one recommended communication service category for the user, providing a recommended communication service list including the non-recommendation message.

* * * * *